(12) United States Patent
Silver et al.

(10) Patent No.: US 11,910,259 B2
(45) Date of Patent: *Feb. 20, 2024

(54) SYSTEM, METHOD, AND COMPUTER-READABLE MEDIUM FOR CONCURRENT TERMINATION OF MULTIPLE CALLS AT A MOBILE TERMINAL

(71) Applicant: TANGO NETWORKS, INC., Frisco, TX (US)

(72) Inventors: Andrew Silver, Frisco, TX (US); Douglas J. Bartek, Frisco, TX (US)

(73) Assignee: TANGO NETWORKS, INC., Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,743

(22) Filed: Oct. 18, 2022

(65) Prior Publication Data
US 2023/0038112 A1    Feb. 9, 2023

Related U.S. Application Data

(63) Continuation of application No. 15/090,991, filed on Apr. 5, 2016, now Pat. No. 11,477,713, which is a continuation of application No. 14/680,473, filed on Apr. 7, 2015, now Pat. No. 9,307,537, which is a continuation of application No. 11/752,042, filed on May 22, 2007, now Pat. No. 9,002,364.

(51) Int. Cl.
H04W 36/24    (2009.01)
H04W 76/15    (2018.01)
H04M 3/42     (2006.01)
H04W 36/28    (2009.01)
H04W 72/0453  (2023.01)
H04W 72/0446  (2023.01)

(52) U.S. Cl.
CPC ....... *H04W 36/24* (2013.01); *H04M 3/42238* (2013.01); *H04W 36/28* (2013.01); *H04W 72/0446* (2013.01); *H04W 72/0453* (2013.01); *H04W 76/15* (2018.02)

(58) Field of Classification Search
None
See application file for complete search history.

(56) References Cited

U.S. PATENT DOCUMENTS 3,806,819 A  *  4/1974  Leonard ............ H03J 7/18
                                           455/179.1
5,134,710 A  *  7/1992  Åkerberg ......... H04W 88/08
                                            370/347

(Continued)

*Primary Examiner* — Christopher T Wyllie

(57) ABSTRACT

A system, method and computer-readable medium for allocating multiple subscriptions to a single mobile terminal thereby allowing concurrent termination of multiple calls at the mobile terminal are provided. A mobile terminal adapted to terminate multiple concurrent calls is described. In one implementation, a network need not have any configuration data regarding the multi-line capabilities of the mobile terminal. In other implementations, network-centric mechanisms are provided for allowing multiple concurrent calls to be terminated by a mobile terminal. Multiple concurrent calls may be terminated at a mobile terminal on separate carrier frequencies or alternatively may be terminated on a common carrier frequency.

20 Claims, 14 Drawing Sheets

(56) References Cited

U.S. PATENT DOCUMENTS

| | | | | |
|---|---|---|---|---|
| 5,507,034 A * | 4/1996 | Bodin | | H04W 72/563 455/452.2 |
| 5,649,303 A * | 7/1997 | Hess | | H04W 16/14 370/348 |
| 5,825,757 A * | 10/1998 | Tat | | H04W 48/16 370/332 |
| 5,926,755 A * | 7/1999 | Ghisler | | H04W 76/10 455/450 |
| 5,933,785 A * | 8/1999 | Tayloe | | H04W 8/26 455/435.2 |
| 6,026,086 A * | 2/2000 | Lancelot | | H04L 12/2801 370/466 |
| 6,044,090 A * | 3/2000 | Grau | | H04L 65/80 725/116 |
| 6,061,559 A * | 5/2000 | Eriksson | | H04W 76/19 455/435.3 |
| 6,069,871 A * | 5/2000 | Sharma | | H04W 16/06 370/335 |
| 6,072,787 A * | 6/2000 | Hamalainen | | H04L 47/2425 370/335 |
| 6,104,930 A * | 8/2000 | Ward | | H04W 16/28 455/562.1 |
| 6,131,033 A * | 10/2000 | Shi | | H04W 16/12 370/335 |
| 6,763,015 B1 * | 7/2004 | Phillips | | H04W 88/06 370/347 |
| 6,799,057 B1 * | 9/2004 | Liverotti | | H04B 1/3816 455/551 |
| 6,839,333 B1 * | 1/2005 | Åkerberg | | H04W 56/003 455/443 |
| 6,922,160 B1 * | 7/2005 | Brown | | H04L 27/38 341/110 |
| 9,002,364 B2 * | 4/2015 | Silver | | H04W 76/15 370/320 |
| 9,307,537 B2 * | 4/2016 | Silver | | H04M 3/42238 |
| 2001/0028644 A1 * | 10/2001 | Barzegar | | H04L 12/2856 370/352 |
| 2002/0060995 A1 * | 5/2002 | Cervello | | H04W 72/02 370/332 |
| 2003/0189910 A1 * | 10/2003 | Yamada | | H04B 1/406 370/335 |
| 2004/0218562 A1 * | 11/2004 | Orava | | H04B 1/406 370/329 |
| 2005/0075106 A1 * | 4/2005 | Jiang | | H04Q 3/005 455/435.3 |
| 2005/0136875 A1 * | 6/2005 | Skarby | | H04B 1/52 455/306 |
| 2005/0170809 A1 * | 8/2005 | Lucidarme | | H04W 88/02 455/406 |
| 2005/0188415 A1 * | 8/2005 | Riley | | H04L 47/821 725/144 |
| 2006/0084439 A1 | 4/2006 | Joshi et al. | | |
| 2006/0135161 A1 * | 6/2006 | Jiang | | H04W 48/02 455/436 |
| 2006/0141944 A1 * | 6/2006 | Shibagaki | | H04B 1/006 455/78 |
| 2006/0199549 A1 * | 9/2006 | Lee | | H01Q 9/145 455/82 |
| 2006/0234693 A1 * | 10/2006 | Isidore | | H04W 4/16 455/424 |
| 2007/0042755 A1 * | 2/2007 | Singhal | | H04M 3/387 455/411 |
| 2007/0042775 A1 * | 2/2007 | Umatt | | H04W 48/16 455/434 |
| 2007/0237103 A1 * | 10/2007 | Reynolds | | H04W 8/04 370/310.2 |
| 2008/0043812 A1 * | 2/2008 | Moffatt | | H04L 27/2628 375/133 |
| 2009/0131048 A1 * | 5/2009 | Kuriyama | | H04W 48/16 455/434 |
| 2013/0297422 A1 * | 11/2013 | Hunter | | H04H 60/63 705/14.58 |

* cited by examiner

SYSTEM, METHOD, AND COMPUTER-READABLE MEDIUM FOR CONCURRENT TERMINATION OF MULTIPLE CALLS AT A MOBILE TERMINAL

CROSS-REFERENCE TO RELATED APPLICATIONS

This application is a continuation of U.S. patent application Ser. No. 15/090,991, filed on Apr. 5, 2016, now U.S. Pat. No. 11,477,713, issued on Oct. 18, 2022, which is a continuation of U.S. patent application Ser. No. 14/680,473, filed on Apr. 7, 2015, now U.S. Pat. No. 9,307,537, issued on Apr. 5, 2016, which is a continuation of U.S. patent application Ser. No. 11/752,042, filed on May 22, 2007, now U.S. Pat. No. 9,002,364, issued on Apr. 7, 2015, the entire disclosures of which are incorporated by reference herein.

FIELD OF THE INVENTION

The present disclosure relates to telecommunications and, more particularly, to mechanisms for terminating calls with mobile terminals.

BACKGROUND

Corporations are increasingly relying on the use of cellular technology by their employees. In many instances, an enterprise may assign a cellular telephone to an employee and maintain a subscription of the cellular telephone. The enterprise subscription may be tailored to authorized employee usage, e.g., allow or disallow calls at certain times of the day, restrictions of supplementary services or long distance calls, etc.

Because of the popularity of cellular services, many employees typically have a personal cellular telephone. Thus, an enterprise employee that has been assigned a corporate cellular telephone may carry multiple cellular telephones which is often considered a nuisance. Often, an employee may prefer the personal handset rather than an employee assigned mobile terminal. However, corporate mobile accounts are typically purchased through a single carrier and thus no contemporary mechanism provides for porting or otherwise using the employee's personal account on the corporate assigned mobile terminal or vice versa. Even if the corporate account and an employee's personal account are managed by a common carrier, no mechanism exists for managing two accounts on a common terminal. Thus, the employee is required to carry the corporate assigned mobile terminal for work-related services and the user's personal mobile terminal for personal communications.

SUMMARY OF THE INVENTION

Embodiments disclosed herein provide mechanisms for allocating multiple subscriptions to a single mobile terminal. Additionally, a mobile terminal adapted to terminate multiple concurrent calls is described. In one implementation, a network need not have any configuration data regarding the multi-line capabilities of the mobile terminal. In other implementations, network-centric mechanisms are provided for allowing multiple concurrent calls to be terminated by a mobile terminal. Multiple concurrent calls may be terminated at a mobile terminal on separate carrier frequencies or alternatively may be terminated on a common carrier frequency.

BRIEF DESCRIPTION OF THE DRAWINGS

Aspects of the present disclosure are best understood from the following detailed description when read with the accompanying figures, in which.

DETAILED DESCRIPTION

Figure 1:
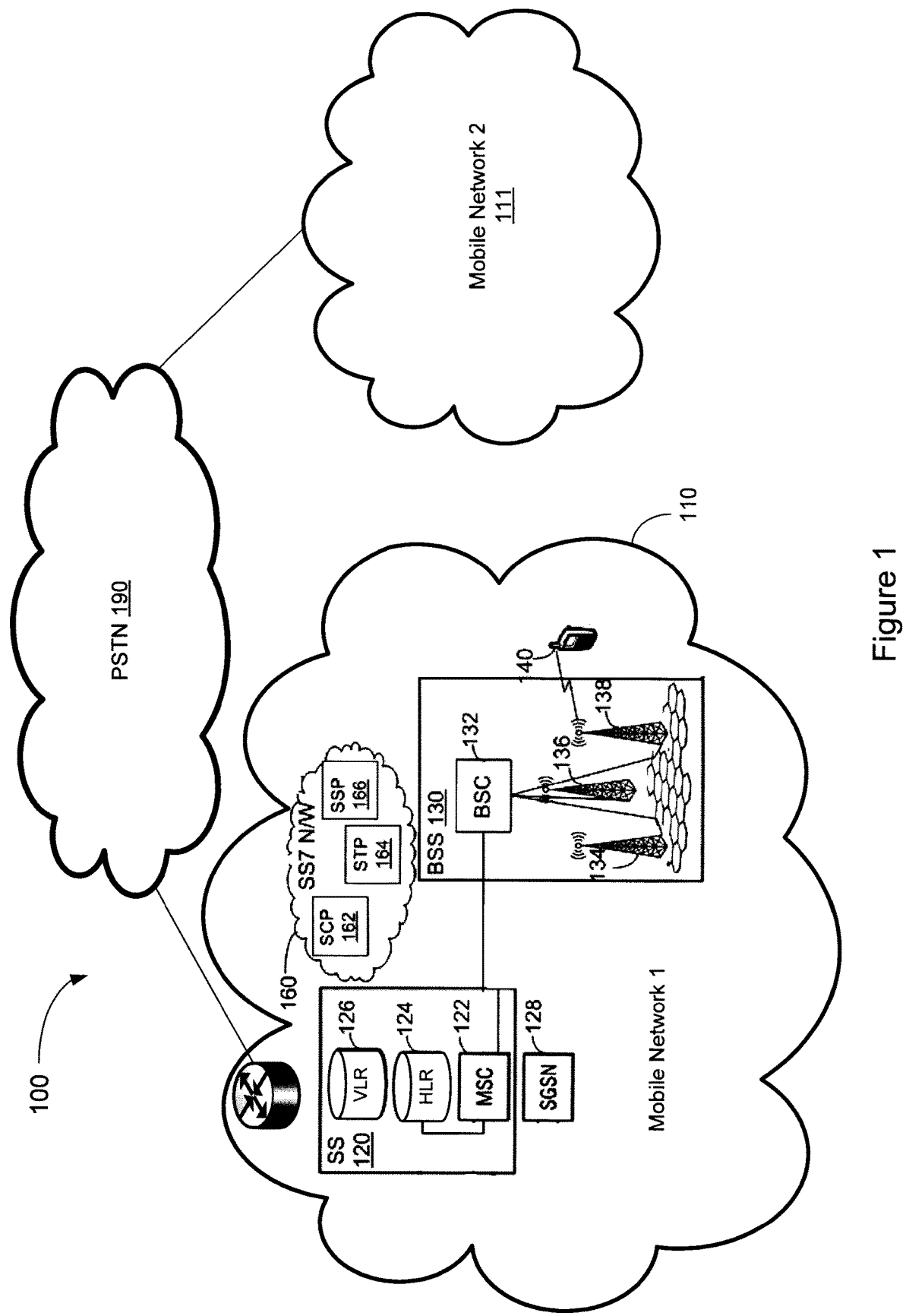
FIG. 1 is a diagrammatic representation of a network in which embodiments disclosed herein may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of a network 100 in which embodiments disclosed herein may be implemented. Network 100 may include a cellular network system 110, such as a Global System for Mobile (GSM) Communications network, a code division multiple access (CDMA) network, a mobile network utilizing IMT-2000, or another suitable mobile network. Cellular network system 110 generally includes a Switching System (SS) 120 and a Base Station System (BSS) 130. In the examples provided herein, mobile network architecture components are made with reference to the GSM, the most popular standard for mobile phones in the world. GSM is both an air interface and networking protocol. The most popular alternative combines the Code Division Multiple Access (CDMA) air interface protocol and the ANSI-41 networking protocol.

Each of SS 120 and BSS 130 contain a number of functional units well understood by those skilled in the art, and a detailed explanation of the various components is unnecessary. Nevertheless, a cursory review of various components is provided. SS 120 contains a Mobile services Switching Center (MSC) 122, a Home Location Register (HLR) 124, and a Visitor Location Register (VLR) 126. MSCs carry out switching functions and manage the communications between mobile phones and the Public Switched Telephone Network (PSTN) 190. HLR 124 comprises the central database that contains details of each mobile phone subscriber that is authorized to use the cellular core network. VLR 126 comprises a database which stores information about all the mobile terminals that are currently serviced by the associated MSC (MSC 122 in the present example). VLR 126 stores various information regarding the mobile terminals, such as the current location area identity that specifies a particular base station controller (BSC) that the mobile station is currently serviced by.

Various other sub-systems or functional modules may, and typically are, included in SS 120, such as an Authentication Center, an Equipment Identity Register, or various other functions. A serving general packet radio service (GPRS) support node (SGSN) 128 may be included in cellular network system 110 to facilitate provisioning of packet services to and from mobile terminals in network system 110. GPRS provides mobility management, session management and transport for Internet Protocol packet services in GSM cellular packet networks.

Network system 110 may also include a signaling system, such as an SS7 network 160. SS7 network 160 provides a set of telephony signaling protocols which are used to set up the vast majority of the world's PSTN telephone calls. SS7 network 160 is also used in cellular networks, such as GSM and UMTS, for circuit switched voice and packet-switched data applications. As is understood, SS7 network 160 includes various signaling nodes, such as any number of service control points (SCPs) 162, signal transfer points (STPs) 164, and service switching points (SSPs) 166.

BSS 130 contains a Base Station Controller (BSC) 132 that may be in communication with and in control of a plurality of Base Transceiver Stations (BTSs) 134-138. Each individual BTS 134-138 under the control of a given BSC 132 may define a radio cell operating on a set of radio channels thereby providing service to a Mobile Terminal (MT) 140. Cellular network system 111 may be implemented in a similar manner as cellular network system 110 or may employ another cellular network architecture. Cellular network system 110, as well as other cellular networks such as cellular network 111, may interface with PSTN 190.

Figure 2:
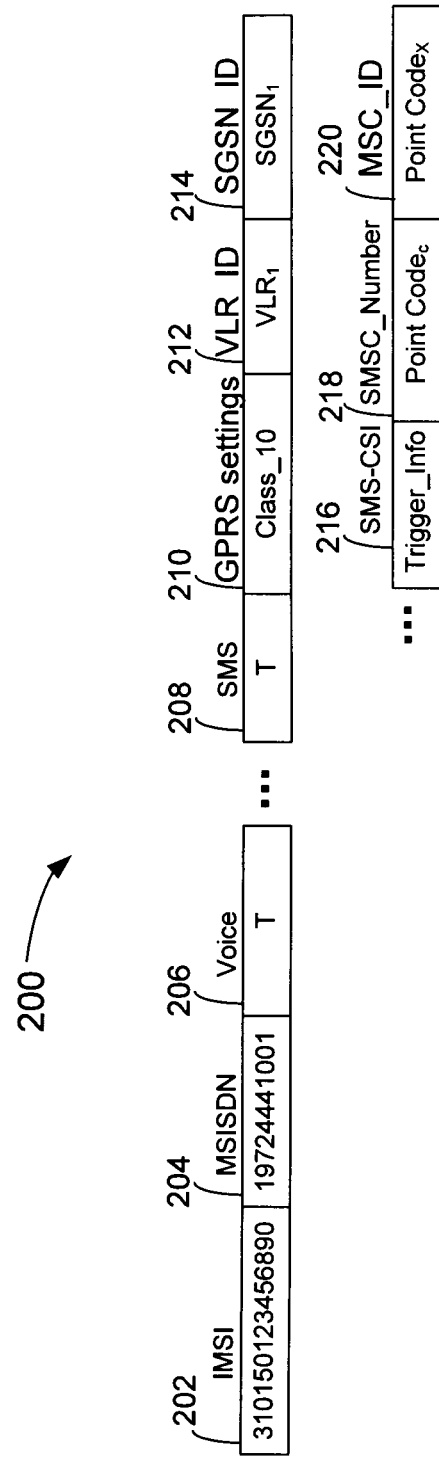
FIG. 2 is a diagrammatic representation of an exemplary HLR record that defines a subscriber profile implemented in accordance with an embodiment.

FIG. 2 is a diagrammatic representation of an exemplary HLR record 200 that defines a subscriber profile implemented in accordance with an embodiment. In general, HLR 124 may, and typically does, include thousands of records each associated with a particular mobile subscriber. Each HLR record includes details of a respective subscriber authorized to use cellular network 110. In the illustrative example, HLR record 200 is representative of an HLR record allocated for mobile terminal 140.

HLR record 200 comprises a plurality of fields 202-220 which each store information regarding a particular mobile terminal assigned to a subscriber of cellular network 110. Fields 402-420 have respective labels of "IMSI", "MSISDN", "Voice", "SMS.", "GPRS_Settings", "VLR_ID", "SGSN_ID", "SMS-CSI", "SMSC_Number," and "MSC_ID". A particular field, e.g., IMSI field 402 and MSISDN field 404, may be designated as a key field and each respective data element is unique within key fields 402-404.

In the illustrative example, IMSI field 402 maintains an International Mobile Subscriber Identity (IMSI) stored in the subscriber identity module (SIM) of the mobile terminal for which HLR record 200 is allocated. The IMSI comprises a unique number associated with a particular mobile terminal. The IMSI is typically a 15-digit number having the first 3 digits that specify a mobile country code followed by a 3-digit mobile network code associated with cellular network 110 to which the mobile terminal is registered. The remaining digits may comprise a mobile subscriber identification number (MSIN) assigned to the customer associated with the mobile terminal. In the illustrative example, the IMSI has a value of "3101501234567190" assigned thereto.

A mobile subscriber ISDN (MSISDN) field 204 may store the MSISDN, or directory number, assigned to the mobile terminal for which record 200 is allocated. In the illustrative example, MSISDN field 204 specifies a MSISDN number of "19124441001", that is the directory number assigned to mobile terminal 140. Each of IMSI field 202 and MSISDN field 204 may be used as primary keys for accessing HLR record 200.

HLR record 200 may record various subscription services for the mobile terminal. In the illustrative example, various service fields may have values that indicate whether the subscriber for which the HLR record is allocated is authorized to use a particular service. In the present example, Voice field 206 has a value of true (T) that indicates that associated subscriber is authorized for voice service, and SMS field 208 has a value of true that indicates the mobile terminal is authorized to originate and receive SMS messages. Various other service fields may, and typically are, included in HLR 400 that each specify any one or more of various subscription services, such as call waiting, call forwarding, and the like.

A GPRS_Settings field 210 may specify whether the mobile terminal has a GPRS subscription and settings thereof. For instance, GPRS_Settings field 210 may have a false setting or have another indicator that specifies the mobile terminal associated with HLR record 200 does not have a valid GPRS subscription. In the event that the mobile terminal has a GPRS subscription, GPRS_Settings field 210 may specify a service class. In the illustrative example, GPRS_Settings field 210 specifies that the associated mobile terminal has a GPRS subscription with a service setting of "Class_10".

VLR_ID field 212 may specify the current VLR servicing the mobile terminal associated with HLR record 400. In the present example, VLR_ID field 212 indicates the mobile terminal is being serviced by a VLR having a VLR ID of $VLR_1$. In a similar manner, SGSN_ID field 214 may specify the current SGSN servicing the mobile terminal associated with HLR record 200. In the present example, SGSN_ID field 214 indicates the mobile terminal is being serviced by an SGSN having an ID of $SGSN_1$.

HLR record 200 may include a Short Message Service-Customized Applications for Mobile networks Enhanced Logic (CAMEL) Subscription Information (SMS-CSI) field 216 containing trigger information. In the illustrative example, the trigger information maintained in SMS-CSI field 216 is diagrammatically represented as "trigger_info". A short message service center (SMSC) Number field 218 may include an identifier, e.g., an SS7 point code, assigned to an SMSC that is to service the associated subscriber. In the illustrative example, SMSC_Number field 218 has a value of Point Code, An MSC_ID field 220 may include an identifier, e.g., a point code, of the MSC currently, or most recently, servicing the mobile terminal associated with HLR record 200. In the present example, the point code of the MSC specified by MSC_ID field is represented as "Point $Code_x$".

In accordance with an embodiment, mechanisms are provided for allocating multiple subscriptions to a single mobile terminal. Additionally, a mobile terminal adapted to terminate multiple concurrent calls is described in accordance with an embodiment. In one implementation, a network need not have any configuration data regarding the multi-line capabilities of the mobile terminal. In other implementations, network-centric mechanisms are provided for allowing multiple concurrent calls to be terminated by a mobile terminal.

Figure 3:
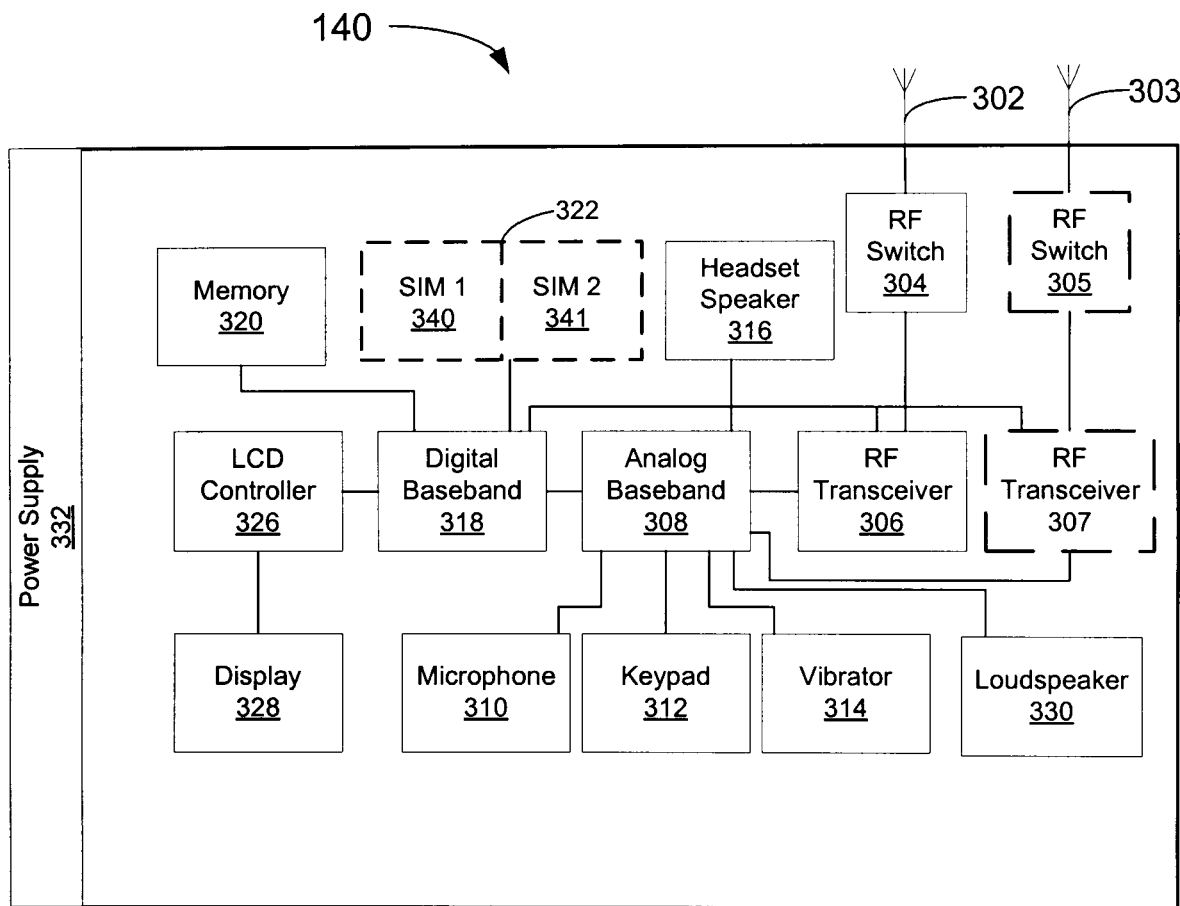
FIG. 3 is a simplified block diagram of an exemplary mobile terminal in which embodiments may be implemented.

FIG. 3 is a simplified block diagram of an exemplary mobile terminal 140 in which embodiments may be implemented. Mobile terminal 140 includes an antenna 302 that may be coupled with an RF switch 304, e.g., a duplexer, coupled with an RF transceiver 306. Transceiver 306 may be coupled with an analog baseband 308 that may handle a variety of analog signal processing functions. In the present example, analog baseband 308 is interconnected with a microphone 310, a keypad 312, a vibrator 314 or other ring alert mechanism, a headset speaker 316, and a loudspeaker 330 for output of speakerphone and incoming call alert audio. Analog baseband 308 may include or interface with an analog to digital converter for converting analog input supplied to microphone 310 into a digital format that may be supplied to a digital baseband 318. Digital baseband 318 may interface with various digital components of mobile terminal 140, such as a memory 320, an optional subscriber identity module (SIM) card 322, and a liquid crystal display controller 326 that drives a display 328. Memory 320 may be implemented as a flash memory, a random access memory, an electronically erasable programmable read-only memory, another solid state device, or a combination thereof. Digital baseband 318 may additionally include or interface with one or more encoders, digital to analog converters, or other modules. A power supply 332 may be coupled with various system modules as is understood.

In accordance with an embodiment, optional SIM card 322 may include two SIMs 340 and 341 each associated with a subscription, or alternatively a Dual SIM or Multi-SIM card in which two or more subscriptions are supported via a single SIM. Thus, mobile terminal 140 may have two HLR records similar to HLR record 200 allocated therefore, and each HLR record specifies a separate subscription associated with mobile terminal 140. The HLR records may be maintained by a common carrier, e.g., the operator of network system 110 depicted in FIG. 1. Alternatively, a first HLR record may be maintained by one carrier such as the operator of cellular network system 110, and another HLR record may be maintained by another carrier, such as an operator of cellular network system 111, thereby allowing separate subscriptions to be provided to mobile terminal 140 from separate carriers.

In accordance with another embodiment, mobile terminal 140 may optionally include a second antenna 303 and RF transceiver 307 coupled with an RF switch 305. In this implementation, a first call may be carried over antenna 302 and transceiver 306, and a second call may concurrently be carried over antenna 303 and transceiver 307. In other embodiments, antenna 303, switch 305, and transceiver 307 may be excluded from mobile terminal 140, and multiple calls may concurrently be carried over antenna 302 and transceiver 306 as described more fully hereinbelow.

Figure 4:
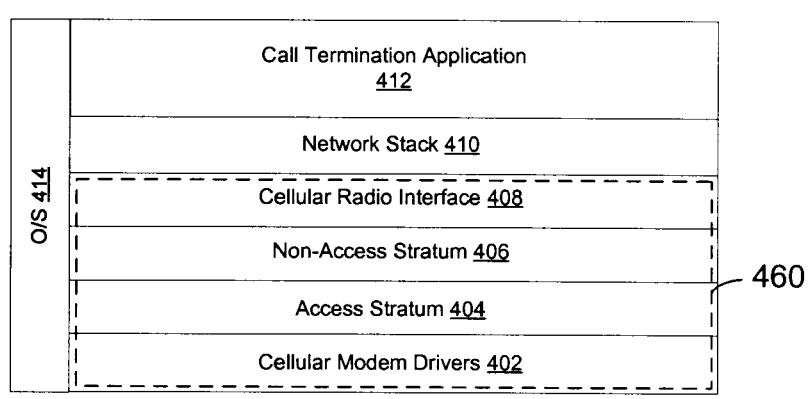
FIG. 4 is a diagrammatic representation of an exemplary software configuration of a mobile terminal adapted for concurrent multi-call termination in accordance with an embodiment.

FIG. 4 is a diagrammatic representation of an exemplary software configuration 400 of mobile terminal 140 adapted for concurrent multi-call termination in accordance with an embodiment. In the exemplary configuration of FIG. 4, the mobile terminal is configured with access network-specific software entities 460, e.g., protocol and driver software associated with a particular access network technology, such as GSM, UMTS, CDMA or another suitable radio access network, and is dependent on the particular cellular network in which the mobile terminal is to be deployed. While configuration 400 depicts a mobile terminal adapted for deployment in a single access network technology type, the mobile terminal may be implemented as a multi-mode device and may accordingly include a plurality of access-specific entities in accordance with an embodiment. The particular configuration 400 is illustrative only and is provided only to facilitate an understanding of embodiments disclosed herein.

In the illustrative example, configuration 400 includes a cellular modem driver 402 for providing a physical interface with the access network in which the mobile terminal is deployed. An access-stratum 404 and a non-access stratum 406 may be included in configuration 400. A cellular radio interface 408 may be communicatively coupled with lower layers of configuration 400 and may additionally interface with network and session management layers, e.g., a network stack 410 such as a TCP/IP layer.

Configuration 400 may optionally include a call termination application 412 for providing mobile terminated mid-call services, such as call waiting, call forwarding, conference calling, and the like, as described more fully hereinbelow. Additionally, configuration 400 includes an operating system 414, such as Symbian, Blackberry O/S, or another operating system suitable for mobile applications, and may coordinate and provide control of various components within the mobile terminal.

Figure 5A:
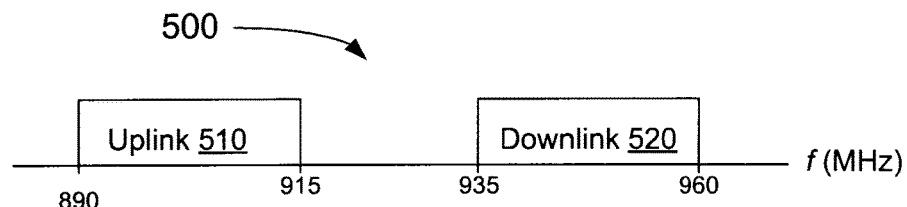
FIG. 5A is a diagrammatic representation of an exemplary cellular network primary band that may be used for allocating multiple concurrent calls in accordance with an embodiment.

FIG. 5A is a diagrammatic representation of an exemplary cellular network primary band 500 that may be used for allocating multiple concurrent calls in accordance with an embodiment. In the illustrative example, primary band 500 includes two 25 MHz sub-bands—an uplink band 510 and a downlink band 520. A given operator may be allocated a portion of primary band 500 for provisioning of cellular service. In the illustrative example, uplink band 510 comprises an 890-915 MHz sub-band, and downlink band 520 comprises a 935-960 MHz sub-band—spectrum typically allocated for a GSM network. Other primary bands may be allocated for use in a GSM system, e.g., an 1800 MHz band comprising an uplink band of 1710-1785 MHz and a downlink band of 1805-1880 MHz.

In GSM, each of the uplink band 510 and downlink band 520 are subdivided into 124 200 KHz carrier frequencies that are each time division multiplexed (TDM) allowing for eight full-rate or sixteen half-rate speech channels per carrier frequency. Allocation of a traffic channel to a mobile terminal comprises assignment of the mobile terminal to a respective time slot of both an uplink carrier frequency and a downlink carrier frequency. As referred to herein, a channel comprises an uplink carrier frequency and a downlink carrier frequency, and a traffic channel refers to both an uplink carrier frequency slot and a downlink carrier frequency slot. Additionally as referred to herein, allocation of a time slot implies allocation of both a time slot on an uplink and downlink carrier frequency.

Figure 5B:
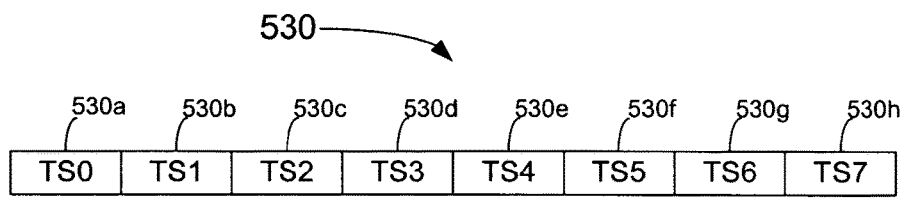
FIG. 5B is a diagrammatic representation of a time division multiplex access (TDMA) frame of a carrier frequency that may facilitate concurrent call termination with a mobile terminal in accordance with an embodiment.

FIG. 5B depicts a diagrammatic representation of a time division multiplex access (TDMA) frame 530 of a carrier frequency that may facilitate concurrent call termination with a mobile terminal in accordance with an embodiment. Frame 530 comprises multiplexed time slots 530a-530h (illustratively designated TS0-TS7) transmitted on respective bursts as is understood. Uplink and downlink frames are similarly multiplexed. When a channel is allocated to a mobile terminal, a particular slot of the available slots of frame 530 is allocated to the mobile terminal, and transmissions to (or from) the mobile terminal are made on the allocated slot of a sequence of TDM frames. In accordance with an embodiment, multiple calls may be terminated to a multi-line mobile terminal by assignment of multiple slots of a TDM frame similar to frame 500 as described more fully hereinbelow.

Typically a carrier is only allocated a portion of band 500, or another suitable band, because many carriers may be licensed to the available spectrum. As is known, a carrier typically partitions the spectrum licensed thereto such that a subset of frequencies are used in a particular cell, with other frequency subsets used in adjacent cells in a manner that provides for so-called frequency reuse. Frequencies may be reused in the network a few cells away from another cell using the same frequency at a distance that interference created by the use of the same spectrum is at an acceptable level.

Figure 6A:
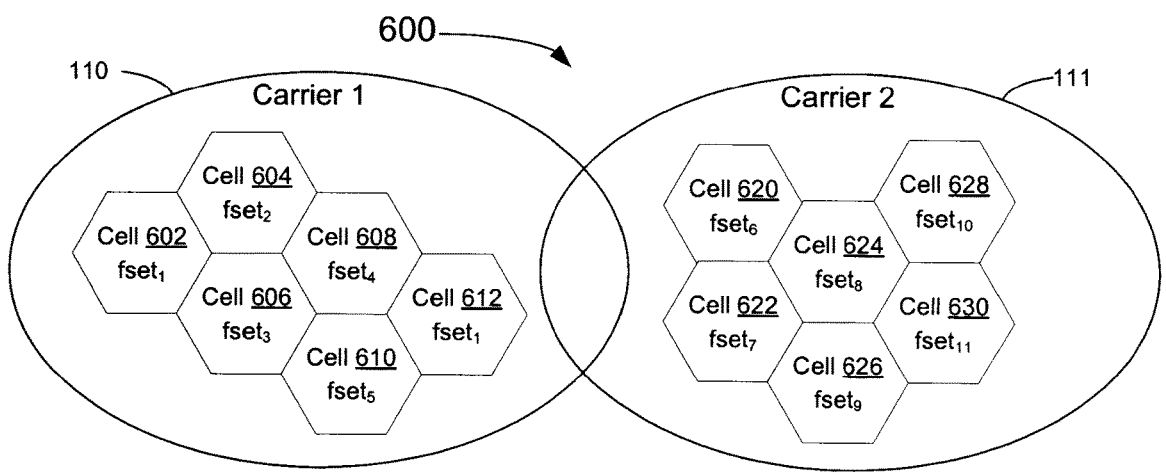
FIG. 6A is a diagrammatic representation of a cell configuration of a network system in which embodiments described herein may be implemented.

FIG. 6A is a diagrammatic representation of a cell configuration 600 of a network system in which embodiments described herein may be implemented. Cell configuration 600 comprises cells 602-612 operated by a carrier (designated Carrier 1) that each provide radio coverage for a geographic area. Cells 602-612 may be provisioned in cellular network system 110 depicted in FIG. 1. Each cell 602-612 includes a BTS (not shown) which is allocated a particular frequency subset of the spectrum licensed to the carrier. In the illustrative example, cells 602-610 are allocated respective frequency sets $fset_1$-$fset_5$. Cell 612 may be located at sufficient distance from cell 602 such that both cell 602 and cell 612 are allocated a common frequency set, or a portion thereof. A carrier typically manages thousands of cell sites, and the example depicted in FIG. 6A is greatly simplified to facilitate an understanding of disclosed embodiments.

Another carrier (designated Carrier 2) may provision cells 620-630. Cells 620-630 may be provisioned in cellular network system 111 depicted in FIG. 1. Assuming that Carrier 1 and Carrier 2 may service a common geographic region, the frequency sets $fset_6$-$fset_{11}$ licensed to Carrier 2 for allocation of cells 620-630 comprise different sets of frequencies than the frequency sets $fset_1$-$fset_5$ licensed to Carrier 1.

Figure 6B:
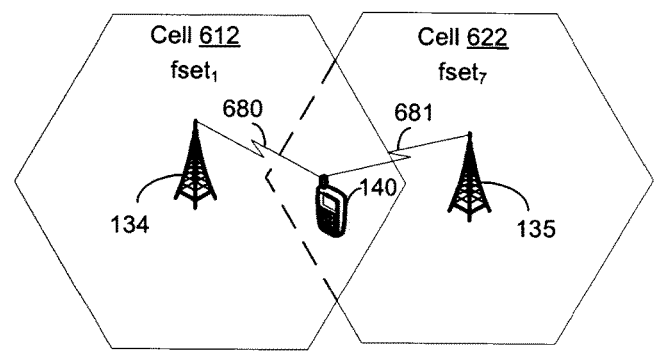
FIG. 6B depicts a diagrammatic representation of overlapping cells that may conjunctively facilitate concurrent termination of multiple calls to a mobile terminal in accordance with an embodiment.

The depiction of cells 602-612 and cells 620-630 in FIG. 6A is not intended to imply geographic distinction between the coverage areas. Rather, one or more cells 602-612 that provide service to subscribers of network system 110 may geographically overlap, at least partially, with one or more cells 620-630 that provide service to subscribers of network system 111. For example, FIG. 6B depicts a diagrammatic representation of cell 612 of network system 110 that overlaps with cell 620 of network system 111 in a manner that facilitates multiple call termination with a mobile terminal in accordance with an embodiment. In the illustrative example, cell 612 is provisioned by a BTS 134 of carrier network 110, and cell 622 is provisioned by a BTS 135 of cellular network system 111. In accordance with an embodiment, multiple subscriptions may be assigned to a mobile terminal 140. In a first implementation, assume mobile terminal 140 has a respective subscription in cellular network system 110 and cellular network system 111. When mobile terminal 140 is implemented with dual SIM card 322, or alternatively separate but multiple SIM cards, and multiple antenna 302-303 and corresponding transceivers 306-307, mobile terminal 140 may have two concurrent calls terminated therewith via respective RF links with BTSs 134 and 135 of network systems 110 and 111. From a network perspective, neither network system 110 nor network system 111 requires any awareness of the multiple-call capabilities of mobile terminal 140 because each network has a subscription allocated to a respective SIM 340-341. For example, each of network systems 110 and 111 may maintain a respective HLR record similar to that depicted in FIG. 2 that includes a respective identifier assigned to mobile terminal 140. The HLR record maintained by cellular network system 110 may maintain an IMSI of SIM 340, and another HLR record maintained by cellular network system 111 may maintain another IMSI of SIM 341. Accordingly, a call may be set up and terminated with mobile terminal 140 by a first cellular network that recognizes mobile terminal 140 based on an IMSI or other unique identifier stored in SIM 340, and another call may be set up and terminated with mobile terminal 140 by a second cellular network that recognizes mobile terminal 140 based on another IMSI or unique identifier stored in SIM 341. A call may be set up and terminated with mobile terminal 140 by one network with which mobile terminal 140 has a subscription while another call is in-progress or concurrently being set up by another cellular network with which mobile terminal 140 has a separate subscription. In other implementations, mobile terminal 140 may not be provisioned with a SIM card but may be equipped with multiple antennas and transceivers. In this instance, multiple carrier networks may maintain respective subscriptions for mobile terminal 140, e.g., based on an electronic serial number or other identifier of the mobile terminal. Accordingly, mobile terminal 140 may be provided with multiple concurrent call terminations in a manner similar to that described above with regard to FIG. 6B.

In accordance with another embodiment, concurrent calls to multi-line mobile terminal 140 may be provisioned by a common cellular network system. In accordance with an embodiment, multiple subscriptions may be maintained for multi-line mobile terminal 140 by a common carrier. For example, if mobile terminal 140 is equipped with multiple SIMs or a dual SIM card 322, a subscription may be associated with each SIM. Other identifiers may be substituted for SIMs 340 and 341 for mobile terminals that do not employ SIMs. In accordance with another embodiment, a single subscription that features a multi-line subscription service may be provisioned to a mobile terminal. In this instance, terminal 140 may feature a single SIM, and the subscription may include an identifier, e.g., in the HLR record allocated for mobile terminal 140, that indicates multi-line authorization for the mobile terminal.

In the event that mobile terminal 140 is equipped with two antennas 302-303 and corresponding transceivers 306-307, multiple calls may be concurrently terminated with mobile terminal 140 on separate carrier frequencies provided by a single network system. In this implementation, the network may be configured to facilitate provisioning of separate carrier frequencies to mobile terminal 140 in a manner that reduces the likelihood of interference between the two carrier frequencies.

Figure 7:
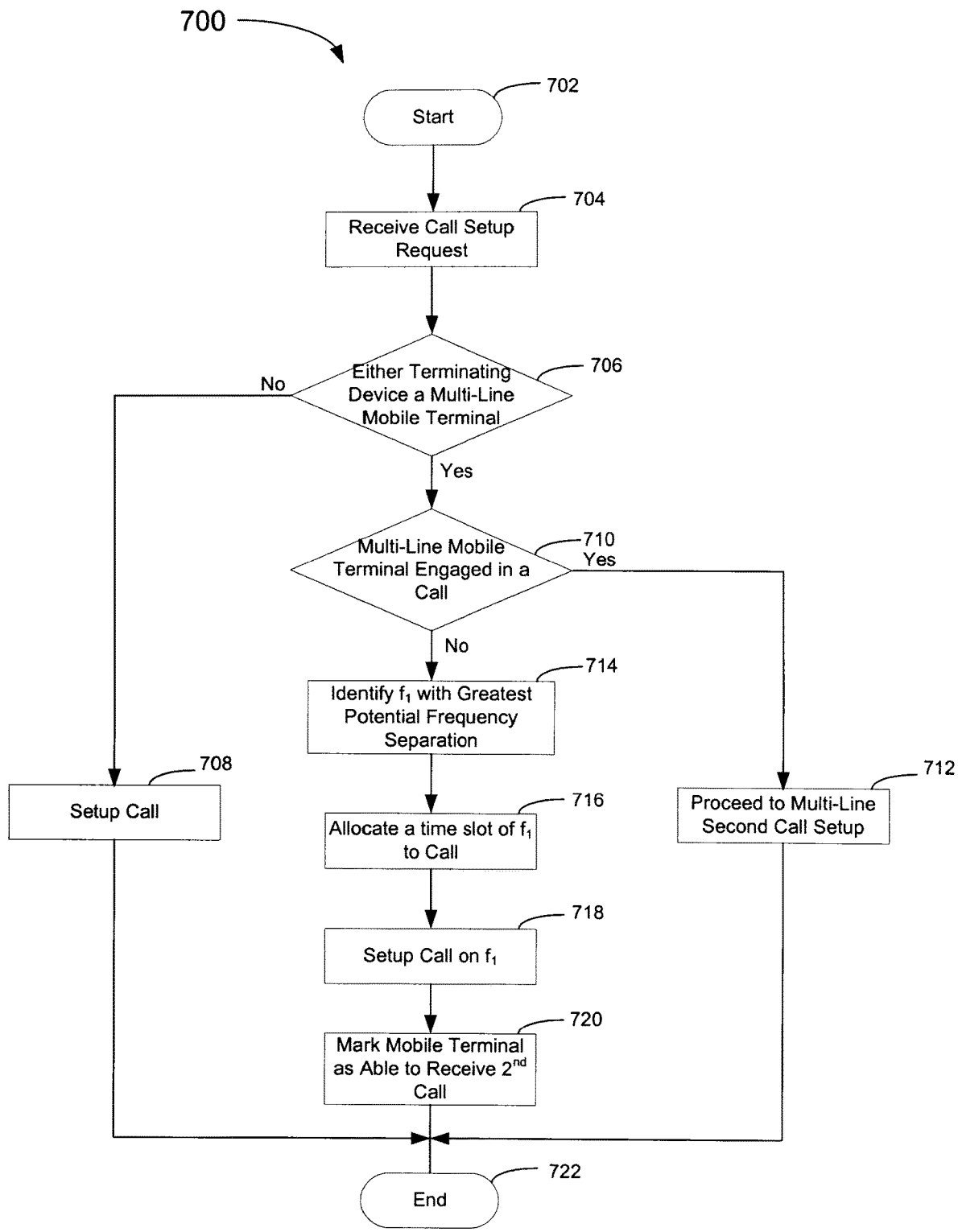
FIG. 7 is a flowchart depicting processing of frequency allocation for a call setup to a multi-line mobile terminal in accordance with an embodiment.

FIG. 7 is a flowchart 700 depicting processing of frequency allocation for a call setup to multi-line mobile terminal 140 in accordance with an embodiment. The processing steps of FIG. 7 may be implemented as computer-executable instructions executable by a processing system, such as a processing system of one or more of a mobile switching center or base station subsystem. The call set-up routine is invoked (step 702), and a call set-up request for a mobile terminal is received (step 704). An evaluation may be made to determine if either the originating or destination device comprises a multi-line mobile terminal (step 706). In neither the originating nor destination device comprises a multi-line mobile terminal, the call may be conventionally set-up (step 708), and the call set-up routine cycle may end (step 722).

Returning again to step 706, in the event that either the origination or destination device comprises a multi-line mobile terminal, an evaluation may be made to determine if the multi-line mobile terminal is presently engaged in a call (step 710). In the event the multi-line mobile terminal is engaged in a call, processing may proceed to a multi-line second call set-up subroutine (step 712) described more fully hereinbelow with reference to FIG. 8.

Returning again to step 710, in the event that the multi-line mobile terminal is not presently engaged in a call, the available frequencies for voice calls may be evaluated to identify a frequency, $f_1$, with a greatest potential frequency separation or spacing from other available frequencies (step 714), e.g., a frequency at or near an upper or lower band limit available for channel allocation. A time slot of the identified frequency, $f_1$, may then be allocated for the current call request (step 716), and the call may be set up on the identified frequency (step 718). It is understood that identification of a carrier frequency $f_1$ includes identification of a particular channel comprising an uplink frequency and a downlink frequency. The multi-line mobile terminal may be marked as able to receive a second call (step 720). For example, a flag or other designator may be set to indicate a second call may be set up with the mobile terminal. The flag may, for example, be maintained in the mobile terminal's HLR record, within the base station controller, within the base station, or another suitable network node. The call setup routine cycle may then end according to step 722.

Figure 8:
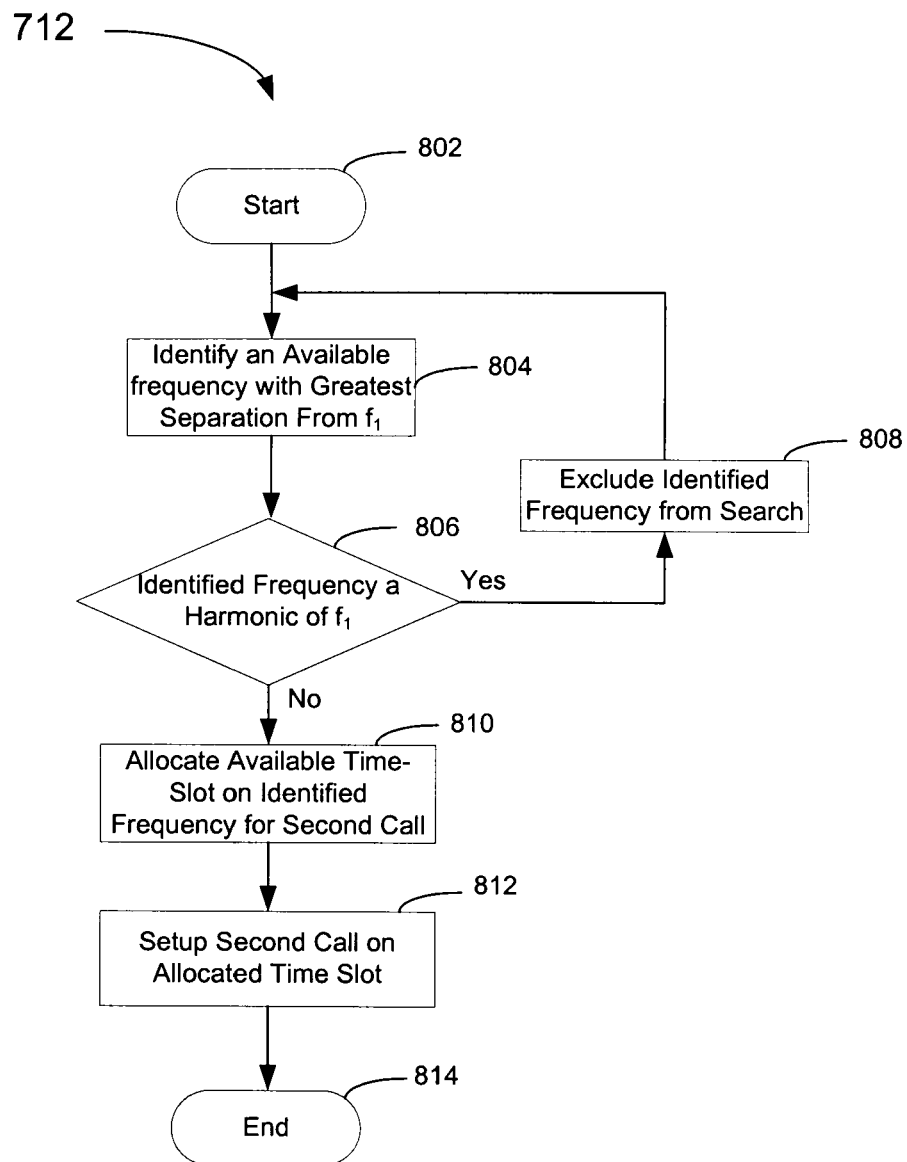
FIG. 8 is a flowchart that depicts processing of a multi-line second call set-up subroutine implemented in accordance with an embodiment.

FIG. 8 is a flowchart 800 that depicts processing of a multi-line second call set-up subroutine implemented in accordance with an embodiment. The processing steps of FIG. 8 may be implemented as computer-executable instructions executable by a processing system, such as a processing system of one or more of a mobile switching center or base station subsystem. The processing steps of FIG. 8 generally correspond to step 712 depicted in FIG. 7.

The set-up subroutine is invoked (step 802), e.g., on receipt of a call request to a multi-line mobile terminal and after a determination is made that the multi-line mobile terminal is currently engaged in a call. An available frequency having the greatest spacing from the frequency, $f_1$, with which the current in-progress call is carried is then identified (step 804). The identified frequency may then be evaluated to determine if it is a harmonic of the in-call frequency, $f_1$ (step 806). In the event that the identified frequency is determined to be a harmonic of the current in-progress call frequency, $f_1$, the identified frequency may be marked as excluded from the current frequency search to avoid unacceptable RF interference between the RF links of the calls (step 808), and processing may return to step 804 to search for another frequency having the greatest separation from the current in-progress call frequency.

When a determination is made that an identified frequency is not a harmonic of the current in-progress call frequency, a time slot on the identified frequency may be allocated for the second call (step 810), and the second call may then be allocated on the allocated time slot (step 812). The call setup subroutine cycle may then end (step 814).

In accordance with another embodiment, multiple concurrent calls may be terminated at a mobile terminal using a single carrier frequency for both calls. Advantageously, mobile terminal 140 need only be equipped with a single antenna and transceiver. Furthermore, by allocating multiple calls on a single frequency, RF interference that may occur when terminating multiple calls on multiple carrier frequencies is avoided.

Figure 9:
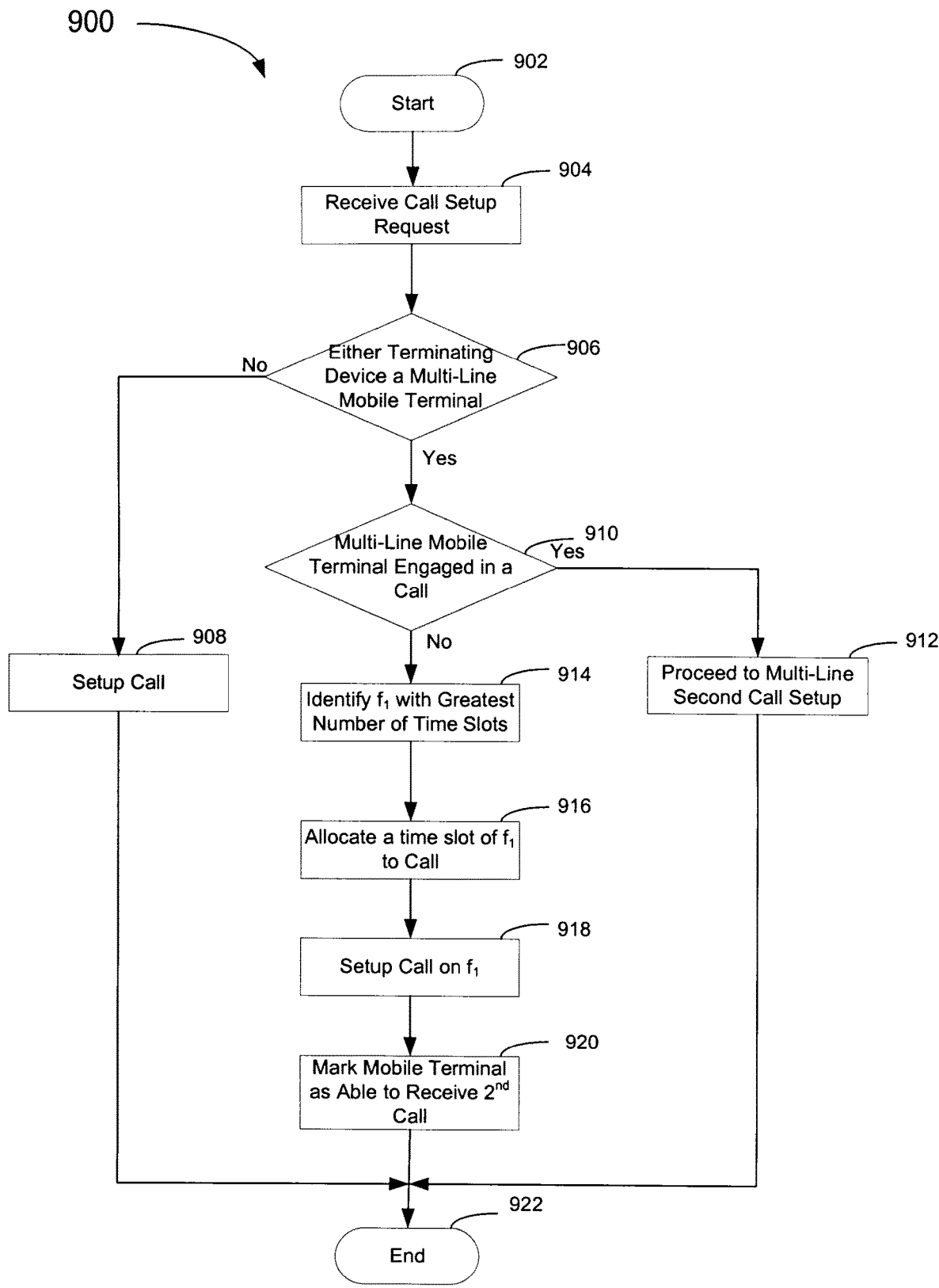
FIG. 9 is a flowchart depicting processing of a multi-line mobile terminal call set-up routine implemented in accordance with an embodiment.

FIG. 9 is a flowchart 900 depicting processing of a multi-line mobile terminal call set-up routine for terminating multiple calls on a common carrier frequency in accordance with an embodiment. The processing steps of FIG. 9 may be implemented as computer-executable instructions executable by a processing system, such as a processing system of one or more of a mobile switching center or base station subsystem. The call set-up routine is invoked (step 902), and a call set-up request for a mobile terminal is received (step 904). An evaluation may be made to determine if either the originating or destination device comprises a multi-line mobile terminal (step 906). If neither the originating nor destination device comprises a multi-line mobile terminal, the call may be conventionally set-up (step 908), and the call set-up routine cycle may end (step 922).

Returning again to step 906, in the event that either the origination or destination device comprises a multi-line mobile terminal, an evaluation may be made to determine if the multi-line mobile terminal is presently engaged in a call (step 910). In the event the multi-line mobile terminal is engaged in a call, processing may proceed to a multi-line second call set-up subroutine (step 912) described more fully hereinbelow with reference to FIG. 10A.

Returning again to step 910, in the event that the multi-line mobile terminal is not presently engaged in a call, the available frequencies for voice calls may be evaluated to identify a frequency, $f_1$, with a greatest number of available time slots (step 914). For example, the frequency set of the current cell serving mobile terminal 140 may be evaluated to determine if any carrier frequencies are wholly unoccupied, that is have no current calls and thus have the complete eight time slots available. If no carrier frequencies of the cell frequency set have eight time slots available, an evaluation may be made to determine if any frequencies have seven available slots. The general procedure may be repeated until a carrier frequency is identified that has an available time slot. A time slot of the identified frequency, $f_1$, may then be allocated for the current call request (step 916), and the call may be set up on the identified frequency, $f_1$ (step 918). The multi-line mobile terminal may be marked as able to receive a second call (step 920). For example, a flag or other designator may be set to indicate a second call may be set up with the mobile terminal. The flag may, for example, be maintained in the mobile terminal's HLR record, within the base station controller, within the base station, or another suitable network node. The call setup routine cycle may then end according to step 922.

Figure 10A:
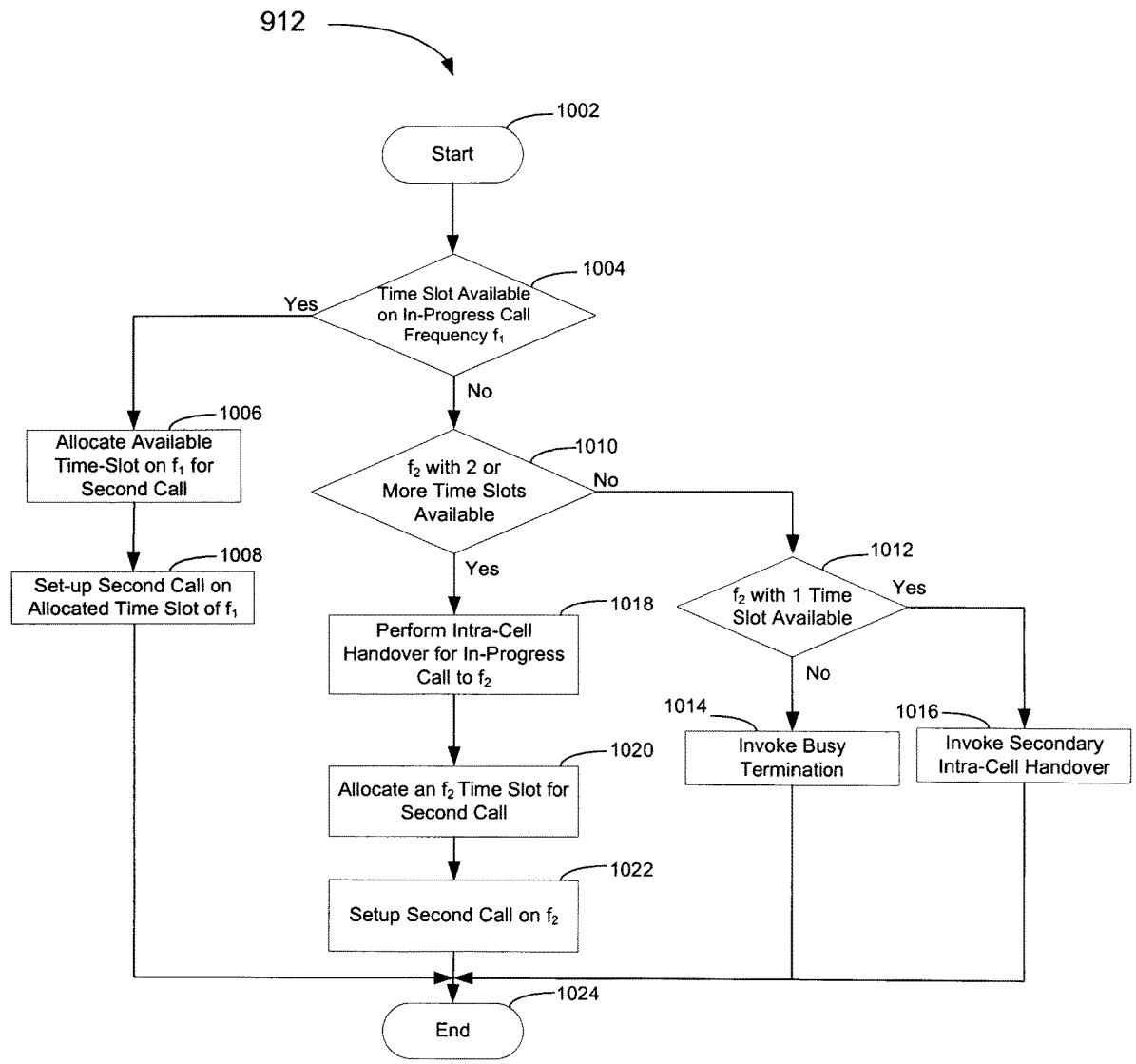
FIGS. 10A-10C depict a flowchart of processing of a multi-line second call set-up subroutine and corresponding diagrammatic representations of carrier frequency configurations implemented in accordance with an embodiment.

FIG. 10A is a flowchart 912 that depicts processing of a multi-line second call set-up subroutine implemented in accordance with an embodiment. The processing steps of FIG. 10A may be implemented as computer-executable instructions executable by a processing system, such as a processing system of one or more of a mobile switching center or base station subsystem. The processing steps of FIG. 10A generally correspond to step 912 depicted in FIG. 9.

The set-up subroutine is invoked (step 1002), e.g., on receipt of a call request to a multi-line mobile terminal and after a determination is made that the multi-line mobile terminal is currently engaged in a call. An evaluation may be made to determine if a time slot is available on the frequency, $f_1$, on which the mobile terminal is currently engaged in a call (step 1004). In the event that a time slot is available on the frequency, $f_1$, of the current call, an available time slot of the frequency $f_1$ may be allocated for the incoming call (step 1006), and the incoming call may be set-up on the allocated time slot (step 1008). The set-up subroutine cycle may then end (step 1024).

Returning again to step 1004, in the event that no time slots are available on the frequency, $f_1$, on which the current call is maintained, an evaluation may be made to determine if any other frequency, $f_2$, is available in the cell in which the mobile terminal is being serviced that has a plurality of time slots available (step 1010). In the event that no frequency, $f_2$, is identified with a plurality of available time slots, an evaluation may be optionally performed to determine if any other frequency, $f_2$, is available in the cell servicing the mobile terminal that has a single time slot available (step 1012). In the event that no frequency is identified that has an available time slot, a busy termination may be invoked to the calling party (step 1014). For example, the calling party may be terminated with a voice mail server, an SMS service, or other suitable busy call termination service. Returning again to step 1012, if a frequency is identified that has an available time slot, a secondary intra-cell handover procedure may be invoked to free a time slot on the carrier frequency, $f_1$, of the in-progress call (step 1016) to facilitate concurrent call termination with the mobile terminal as described more fully hereinbelow with reference to FIG. 11A.

Figure 10B:
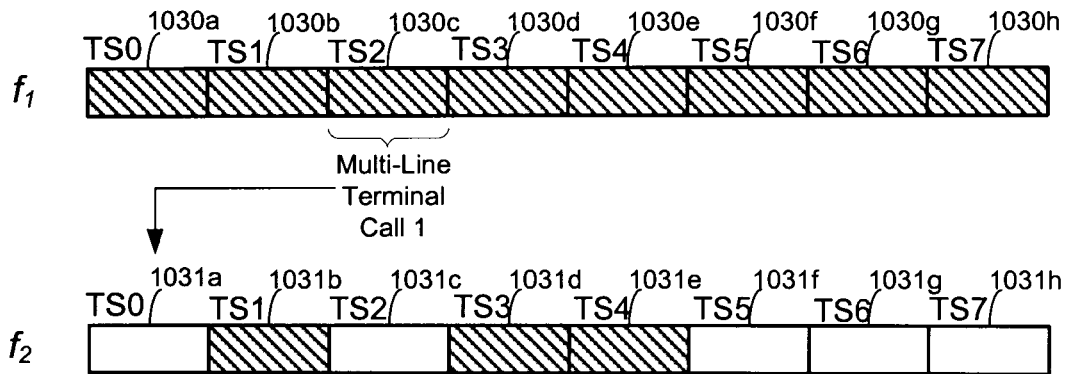
Figure 10C:
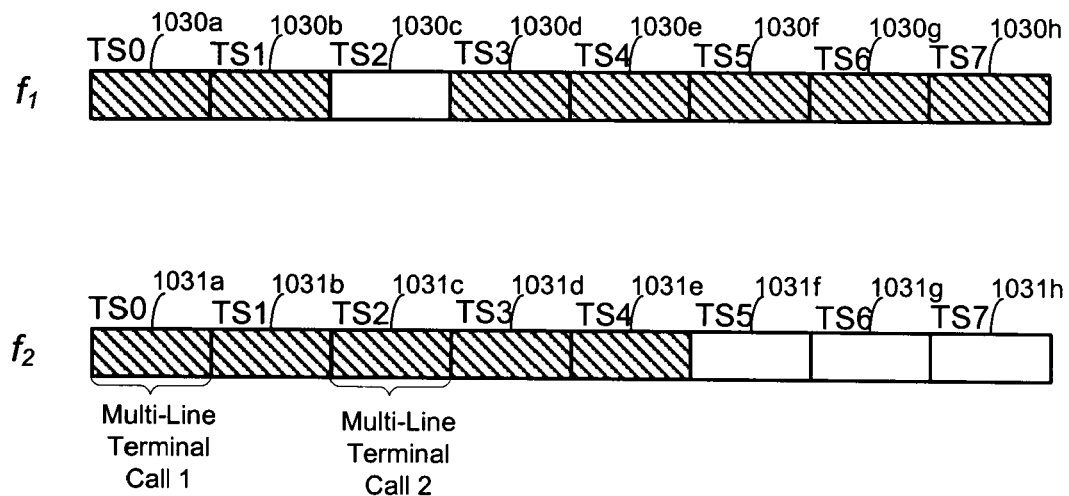

Returning again to step 1010, in the event that a frequency, $f_2$, is identified that has a plurality of time slots available, an intra-cell handover may be invoked for the in-progress call from frequency $f_1$ to frequency $f_2$ (step 1018). As is understood, an intra-cell handover comprises a procedure in which a call (or data session) is transferred from one channel to another within a common cell. That is, a call that is subjected to an intra-cell handover is transferred from a first frequency of a frequency set of the cell to a second frequency of the cell's frequency set. Thus, in the event that a second call request is directed to a multi-line mobile terminal that is occupying a time slots of a carrier frequency, $f_1$, with no available time slots, an intra-cell handover may be performed that transfers the current call to a second frequency, $f_2$, within the cell that has capacity for allocation of the second call. For illustrative purposes, assume a multi-line mobile terminal is engaged in a call on a carrier frequency, $f_1$, as depicted in FIG. 10B. In this instance, the multi-line mobile terminal is engaged in a call on time slot 1030c, and all other time slots 1030a-1030b and 1030d-1030h are currently in use for other calls (as illustratively designated with cross hatches). In the present example, another available frequency, $f_2$, has multiple time slots 1031a, 1031c, and 1031f-1031h available and thus may be selected for an intra-cell handover of the multi-line mobile terminal call. In the depicted example, a handover of the in-progress call is made from time slot 1030c of frequency $f_1$ to time slot 1031a of frequency $f_2$ as depicted in FIG. 10C. A second time slot, e.g., time slot 1031c, of the frequency, $f_2$, to which the mobile terminal has been transferred may then be allocated for the second call request (step 1020), and the incoming call may then be set-up on frequency $f_2$ (step 1022). Thus, both calls are then carried on frequency $f_2$. The set-up subroutine cycle may then end according to step 1024.

Figure 11A:
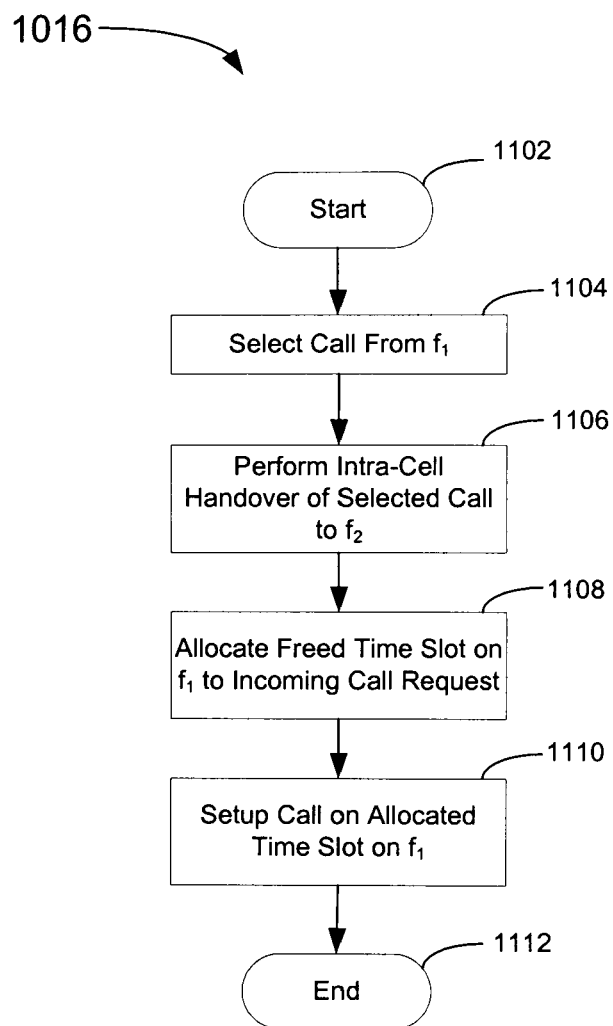
FIGS. 11A-11D depict a flowchart of processing of a secondary intra-cell handover procedure that facilitates concurrent termination of multiple calls with a mobile terminal and corresponding representations of carrier frequency configurations in accordance with an embodiment.

FIG. 11A is a flowchart 1016 that depicts processing of a secondary intra-cell handover procedure that facilitates concurrent termination of multiple calls with a mobile terminal in accordance with an embodiment. The processing steps of FIG. 11A may be implemented as computer-executable instructions executable by a processing system, such as a processing system of one or more of a mobile switching center or base station subsystem. The processing steps of FIG. 11A generally correspond to step 1016 depicted in FIG. 9.

Figure 11B:
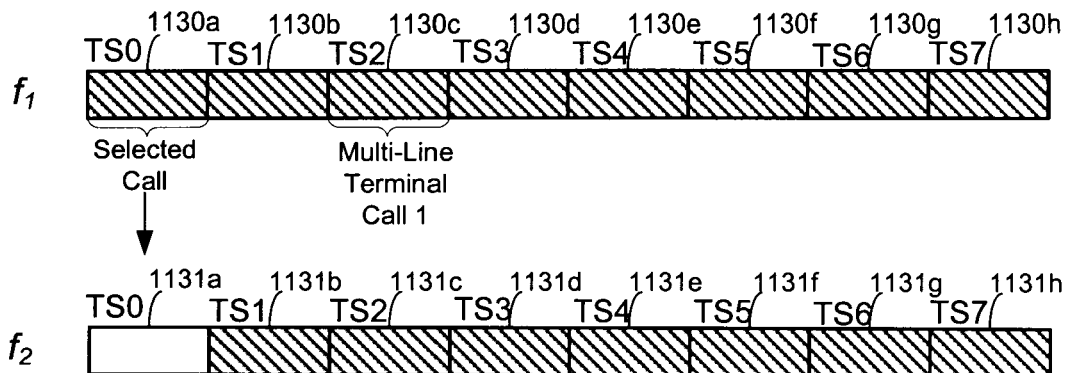
Figure 11C:
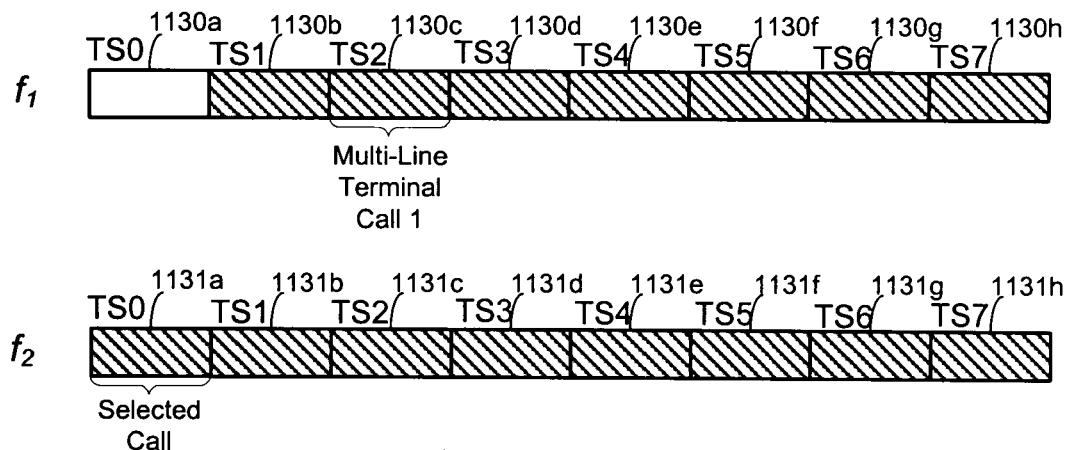
Figure 11D:
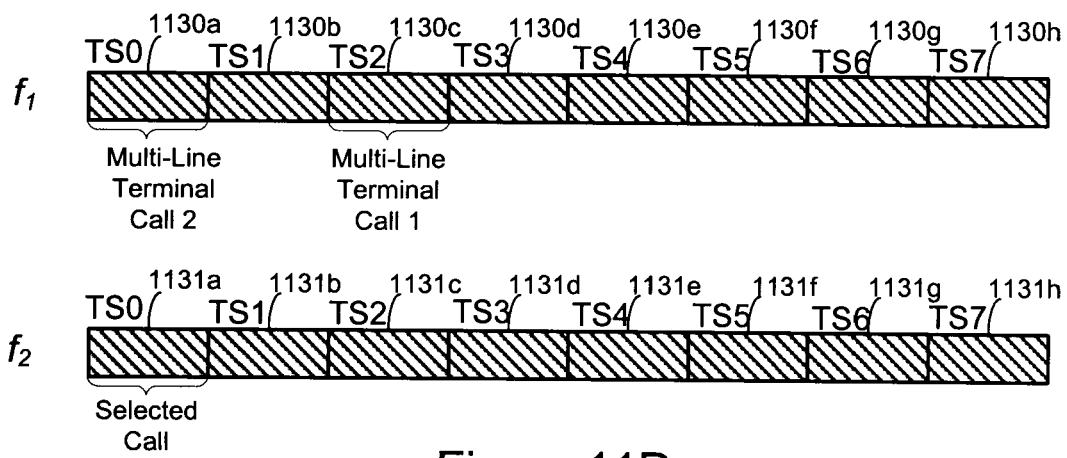

The secondary intra-cell handover procedure is invoked (step 1102), e.g., on a determination that the carrier frequency, $f_1$, of the in-progress call does not have any available time slots for a second incoming call, and on identification of another carrier frequency, $f_2$, that has a single time slot available for a call. In the example depicted in FIG. 11B, the multi-line mobile terminal has an in-progress call allocated on time slot 1130c of the carrier frequency $f_1$, and all other time slots 1130a-1130b and 1130d-1130h are currently allocated for other calls (as illustratively designated with cross hatches). The carrier frequency $f_2$ has a single time slot 1131a that is currently available. A call is selected on the carrier frequency, $f_1$, on which the multi-terminal call has an in-progress call (step 1104). In the present example, a call allocated on time slot 1130a is selected for an intra-cell handover. Selection of a call on the frequency $f_1$ excludes selection of the in-progress multi-terminal mobile call for which a second call request has been received and may exclude any other multi-terminal call that is in-progress with two concurrent calls. Upon selection of a suitable call on the carrier frequency $f_1$, an intra-cell handover may be performed for the selected call to transition the selected call from the carrier frequency $f_1$ to $f_2$ (step 1106). In the present example, the selected call is transferred from time slot 1130a of frequency $f_1$ to time slot 1131a of frequency $f_2$ as depicted in FIG. 11C. Thus, the time slot 1130a of carrier frequency $f_1$ on which the transitioned call previously used is freed. Accordingly, the freed time slot 1130a on the carrier frequency $f_1$ may then be allocated for the incoming call request to the multi-line mobile terminal having an in-progress call on the carrier frequency $f_1$ (step 1108). The second call may then be set-up with the multi-line mobile terminal on the time slot allocated on frequency $f_1$ (step 1110) as depicted in FIG. 11D. The secondary intra-cell handover procedure cycle may then end (step 1112).

In accordance with another embodiment, carrier frequency selection for incoming calls may be made with a preference to carrier frequencies that do not have a multi-line mobile terminal call allocated thereon. This implementation may be made in an attempt to maintain time slot availability on a carrier frequency that has a multi-line mobile terminal call allocated thereon such that, in the event a second call request is directed to the mobile terminal having an in-progress call, the second call may be allocated on the carrier frequency on which the mobile terminal is already engaged in the first call.

Figure 12:
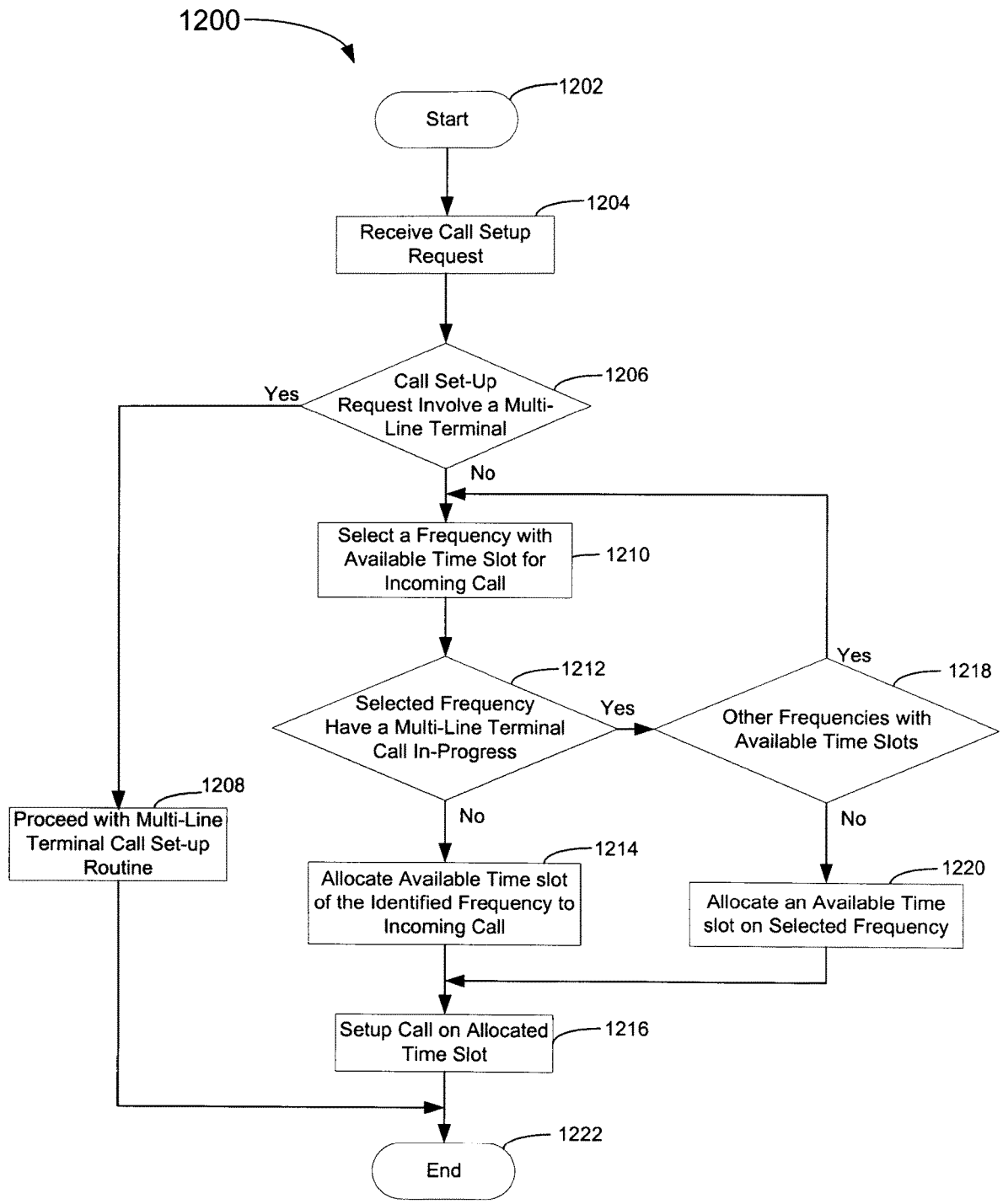
FIG. 12 is a flowchart depicting a call set-up processing routine providing preference to carrier frequencies that do not have a multi-line mobile terminal call allocated thereon for call requests implemented in accordance with an embodiment.

FIG. 12 is a flowchart 1200 depicting call set-up processing routine providing preference to carrier frequencies that do not have a multi-line mobile terminal call allocated thereon for call requests implemented in accordance with an embodiment. The call set-up processing described with reference to FIG. 12 may be implemented as executable instructions of a computer-readable medium for execution by a processing system, such as a mobile switching center, a base station controller, a base transceiver station, or other components of a base station sub-system.

The call set-up processing routine is invoked (step 1202), and a call set-up request is received (step 1204). The call set-up request may be evaluated to determine if either an origination device or a destination device of the call set-up request is a multi-line mobile terminal (step 1206). In the event either of the origination or termination device comprises a multi-line mobile terminal, the call may be set-up with a multi-line terminal call set-up routine (step 1208), e.g., according to the set-up routine described with reference to FIG. 7 or the call set-up routine described with reference to FIG. 9. The call set-up routine cycle may then end (step 1222).

Returning again to step 1206, in the event that neither the origination or destination device of the call set-up request is a multi-line mobile terminal, a carrier frequency with an available time slot may be selected (step 1210) and evaluated to determine if any calls allocated on the selected carrier frequency are terminated at a multi-line mobile terminal (step 1212). In the event that no call allocated on the selected carrier frequency is terminated with a multi-line mobile terminal, a time slot of the selected frequency may be allocated for the call request (step 1214), and the call may then be set-up on the allocated time slot (step 1216). The call set-up routine cycle may then end according to step 1222.

Returning again to step 1212, in the event the selected frequency has a multi-line mobile terminal call in progress allocated thereon, an evaluation may be made to determine if any other carrier frequencies of the serving cell have any available time slots for the call request (step 1218). If any other carrier frequencies have an available time slot for the call request, processing may return to step 1210 to select the identified carrier frequency and thereafter evaluate the selected frequency to determine if any multi-line mobile terminal calls are allocated thereon. In the event that it is determined at step 1218 that no other carrier frequencies have available time slots for the call request, a time slot of the selected frequency may be allocated for the call request (step 1220), and the call may then be set-up on the allocated time slot according to step 1216. In this manner, preference is given to setting up calls that do not involve a multi-line mobile terminal on frequencies that do not have a multi-line mobile terminal call allocated thereon. Thus, the likelihood of a time slot being available for a second call to a multi-line mobile terminal engaged in a call is advantageously enhanced.

In other embodiments, one or more frequencies of a cell's frequency set may be designated for carrying only calls of multi-line mobile terminals to further enhance the likelihood of a time slot being available for a multi-line mobile terminal to receive a second call. An attempt to set up a call involving a multi-line mobile terminal is first made with the frequencies allocated for multi-line mobile terminals, and if none are available, the call may be set up on the other frequencies allocated for non multi-line mobile terminals. In a similar manner, when non multi-line mobile terminal calls are placed or received in a cell, a subset of the frequency set of the cell may be allocated for non multi-line mobile terminals, and an attempt to locate an available channel within the frequencies allocated for non multi-line mobile terminals is made. In the event that no channels of frequencies allocated for non multi-line mobile terminals are available, the non multi-line mobile terminal call may then be set up on a frequency allocated for multi-line mobile terminals.

In accordance with the multi-line termination embodiments described above, various mid-call services that are conventionally provided over a single line may be extended for multiple lines. In this manner, mid-call services may be managed by multi-line mobile terminal 140, e.g., by call termination application 412. Processing of the first and second calls may be performed by call termination application 412 on two distinct and fully allocated channels, e.g., either two physical channels such as the multi-line call scenario depicted and described with reference to FIG. 6B, or on multiple channels allocated on a common carrier frequency. Thus, for example, if the user elected to hold the second call, call termination application 412 receives any content on the second channel and discards or otherwise ignores the second channel content thereby prohibiting the second channel content from being processed for output to the user, e.g., by disallowing decoded content of the second channel from being processed by analog baseband 308 for output over headset speaker 316.

In one implementation, a mobile-controlled call waiting service may be serviced by call termination application 412. Conventional call waiting services are managed by the carrier network. However, in some embodiments disclosed herein, the carrier network(s) may be unaware of the multi-line capabilities of mobile terminal 140, and in other embodiments advantages may be realized by provisioning of a call waiting service at mobile terminal 140. Assume for illustrative purposes that mobile terminal 140 has an in-progress call on a first line, and that a second call request is received by mobile terminal 140 on the second line, e.g., on a separate physical carrier received on a second antenna/transceiver of the mobile terminal or, alternatively, multiplexed with the first call on a common frequency. In this instance, call termination application 412 may be adapted to recognize a second incoming call, e.g., by a ringing signal or a ring message that directs the mobile terminal to output a ring tone over loudspeaker 330, while the first call is in-progress. In response to detection of a ringing signal or ring message, call termination application 412 may be adapted to discard the ringing signal or ring message or otherwise prohibit a ring tone from output over loudspeaker 330 and instead output a suitable second call alert, e.g., a "beep" on speaker 316. If the user selects to hold the call, call termination application 412 may output a call accept notification to the network supplying the second call to the mobile terminal. In this instance, the second call is connected to mobile terminal 140, and call termination application 412 holds the call at the mobile terminal. That is, a channel is allocated and the second call is set-up between mobile terminal 140 and the carrier network of the second call. Any content received by mobile terminal 140, e.g., voice content, supplied by the second calling party may be discarded or otherwise prohibited from output on headset speaker 316 while the second call is on hold. To this end, when the second call is set-up, call termination application 412 may periodically provide an indication to the second calling party over the second call channel that the call is on hold. Other mid-call services may similarly be provisioned. A menu of user selectable options may be provided to the user, e.g., on display 328, that allows for selection of various mid-call options, such as hold call, accept call, conference call, forward call, transfer call or the like. Call termination application 412 may process the second call according to the user response.

In another embodiment, the second call may be conferenced with the first in response to user selection of a conference call selection. Accordingly, call termination application 412 may output a call accept notification to the network supplying the second call notification to the mobile terminal. In this instance, the second call is connected to mobile terminal 140, and call termination application 412 may bridge decoded content of the second call with the first call. Additionally, call termination application 412 may be responsible for directing any uplink content originated at mobile terminal 140 to both the first and second calls.

Figure 13:
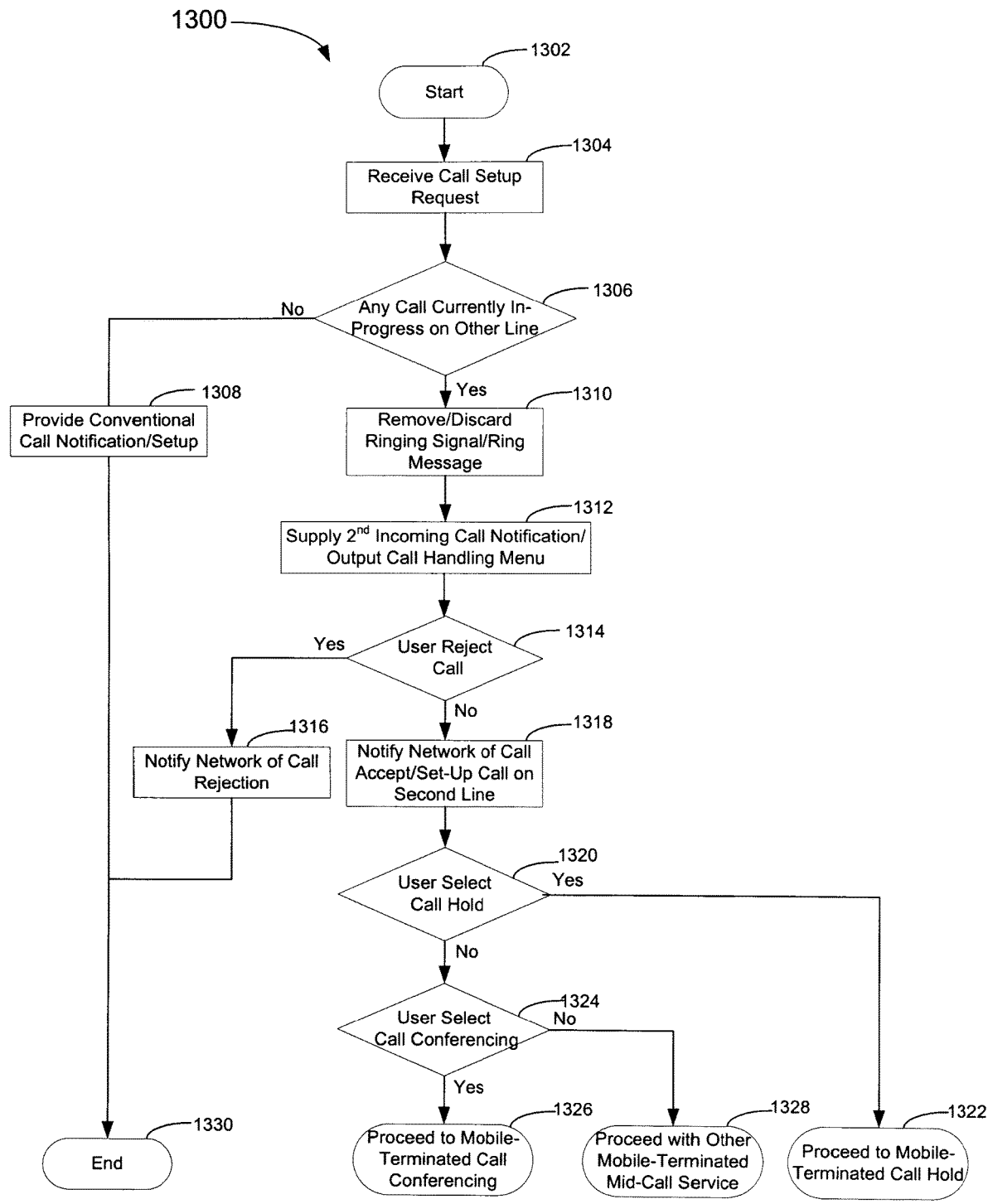
FIG. 13 is a flowchart depicting a call termination application processing for providing mid-call services in accordance with an embodiment.

FIG. 13 is a flowchart depicting call termination application 412 processing for providing mid-call services in accordance with an embodiment. The processing steps of FIG. 13 may be implemented as computer-executable instructions executable by a processing system, such as a processing system of mobile terminal 140. The call termination application is invoked (step 1302), and a call request is received at the mobile terminal (step 1304). An evaluation may be made to determine if any call is currently in progress on the other line of the mobile terminal (step 1306). If no call is currently in progress, the incoming call may be set-up through conventional routines (step 1308), and the call termination application processing cycle may then end (step 1330).

Returning again to step 1306, in the event that another call is determined to be in progress on the other mobile terminal line, the call termination application may remove the incoming ringing signal (or ring message) (step 1310) such that a ring tone is not output over the mobile terminal loudspeaker 330. A second incoming call notification, e.g., an audible beep or other tone, may then be output through headset speaker 316 along with a menu of user selectable call handling options on display 328 (step 1312). An evaluation may then be made to determine if the user has selected a second call rejection option (step 1314). In the event that the user has rejected the second incoming call, the carrier network may be notified of the call rejection (step 1316) such that a network managed call termination, e.g., with a voice mail server or the like, may be provided to the second calling party.

Returning again to step 1314, if the user has not rejected the call, the carrier network of the second call may be notified with a call acceptance, and the second call may be set-up on the second channel (step 1318). An evaluation may then be made to determine what call handling procedure has been selected by the user, e.g., whether the user has elected to put the second incoming call on hold (step 1320). If the user has selected to put the second call on hold, the call termination application may then proceed to a mobile-terminated call hold routine (step 1322). For example, the call termination application may periodically transmit a notification to the second calling party that the call is on hold while discarding or otherwise prohibiting loudspeaker output of any audio content received on the second channel by the mobile terminal. If the user has not selected a call hold service, an evaluation may be made to determine if the user has selected call conferencing of the second call (step 1324). If it is determined that the user selected call conferencing, the call termination application may proceed to invoke a mobile-terminated call conferencing subroutine (step 1326). For example, the call termination application may bridge any decoded audio content received on the second channel with decoded audio content received on the first channel, and the bridged content may be output on headset speaker 316 and transmitted on the first call uplink channel and the second call uplink channel. Other mobile-terminated mid-call services may likewise be invoked (step 1328).

In accordance with another embodiment, a call termination application 412 may facilitate a call forwarding mid-call service for receiving a call on one channel, and forwarding the received call from the mobile terminal on another channel. For example, assume mobile terminal 140 receives a call on a first channel associated with a first subscription allocated for the mobile terminal. Call termination application 412 may be configured with a directory number for call-forwarding. When a call is received by mobile terminal 140, the mobile terminal may redirect the call as a call originated from the mobile terminal on another channel in association with the second subscription. In this manner, the user may avoid incurring network tariffs levied against the first account for call forwarding charges, as the call is effectively redirected through the second account as an outbound call.

In another embodiment, the first call may be transferred to a another destination using a second line on the multi-line mobile such that the multi-line mobile phone bridges the incoming call with the outgoing call and the user of the multi-line phone may remove themselves from the conversation. In this case the conversation will continue using the multi-line phone without the user participating in the call. During the setup of the transfer, the user of the multi-line phone may first consult with the second destination before invoking the transfer (e.g., Consultative Transfer), or may elect to transfer the call without consultation (e.g., Blind Transfer).

Figure 14:
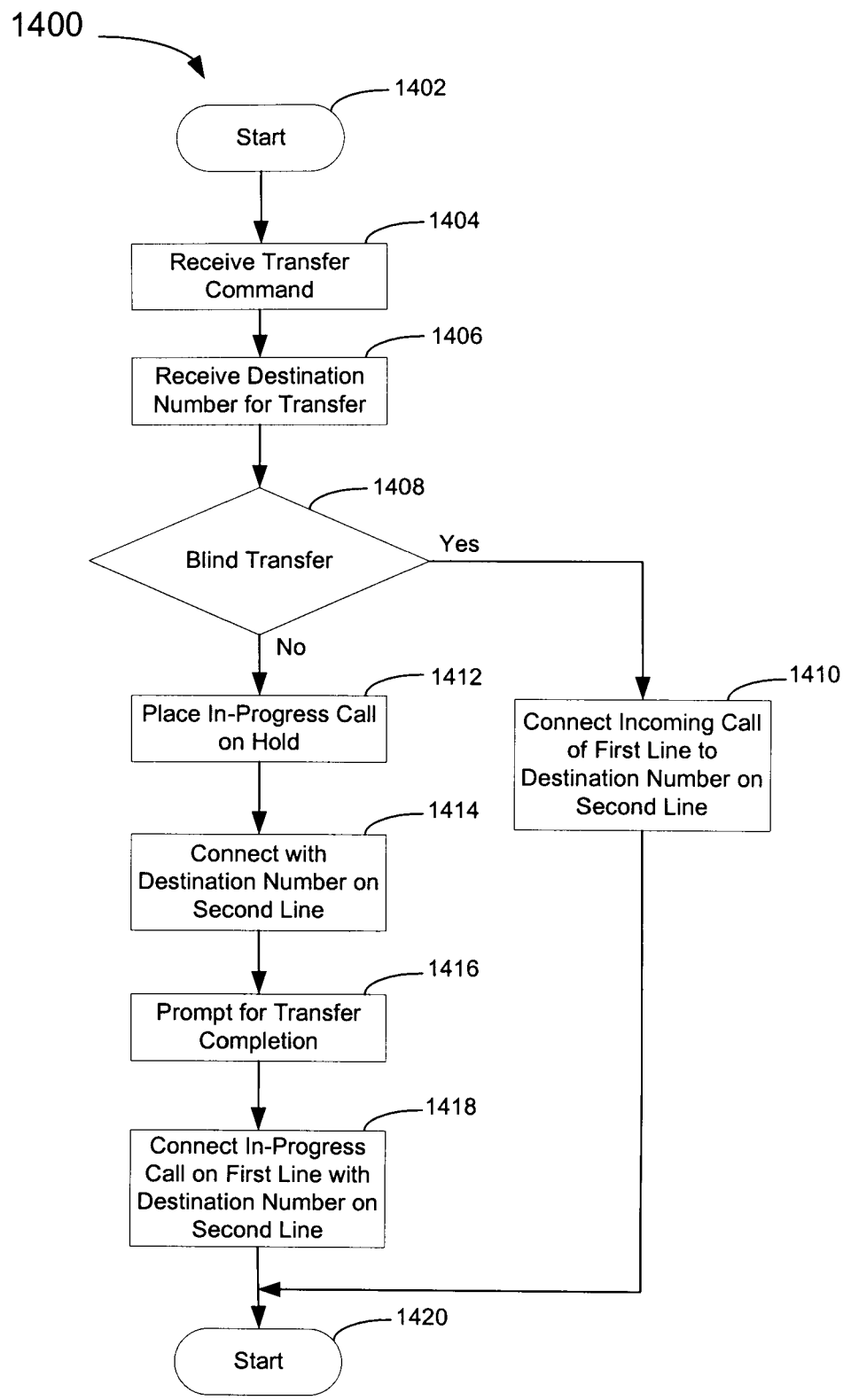
FIG. 14 is a flowchart depicting a call transfer procedure executed at a multi-line mobile terminal in accordance with an embodiment.

FIG. 14 is a flowchart of a call transfer procedure executed at a multi-line mobile terminal in accordance with an embodiment. The procedure is invoked (step 1402) while a multi-line mobile terminal has an in-progress call on a first line of the mobile terminal. A transfer command is received by call termination application 412 (step 1404), e.g., selection of a transfer option by the user of the multi-line mobile terminal. A destination number for forwarding the call may then be received by call termination application 412 (step 1406). The destination number may be input by the user after selection of the call forward command, or may alternatively be pre-configured with call termination application 412. An evaluation may be made to determine if a Blind transfer has been selected (step 1408). In the event that a blind transfer was selected, call termination application 412 may connect to the destination number on the second line and bridge the call of the first line to the second line (step 1410). Call termination application 412 may suppress any audio input at the multi-line terminal so only audio supplied on the first line is transferred on the uplink of the second line. Call termination application 412 may additionally suppress any audio received on the second line that is bridged to the uplink of the first line from being output by the mobile terminal. Thus, from a user perspective, the multi-line mobile terminal does not appear to be connected with the transferred call. That is, a user of the mobile terminal may not actively participate in the forwarded call. The procedure cycle may then end (step 1420).

Returning again to step 1408, in the event that a Blind transfer was not selected thus indicating that a Consultative transfer is to be performed, call termination application 412 may place the in-progress call on hold (step 1412) by discarding or otherwise suppressing any audio received on the downlink of the first line and any audio input received at the mobile terminal. Call termination application 412 may also periodically transmit a notification to the first line party that the call is on hold. The second line of the multi-line mobile terminal may then be used to connect with the destination number (step 1414). In this instance, the user of the multi-line mobile terminal may engage in a conversation with the party at the destination number. During this time, call termination application 412 may present a complete transfer prompt, e.g., on display 328. On receipt of complete transfer command, the first line may be bridged with the second line (step 1418). To this end, call termination application 412 may suppress any audio input at the multi-line terminal so only audio supplied on the first line is transferred on the uplink of the second line. Call termination application 412 may additionally suppress any audio received on the second line that is bridged to the uplink of the first line from being output by the mobile terminal. Thus, from a user perspective, the multi-line mobile terminal does not appear to be connected with the transferred call.

As described, mechanisms for allocating multiple subscriptions to a single mobile terminal are provided. A mobile terminal adapted to terminate multiple concurrent calls is described. In one implementation, a network need not have any configuration data regarding the multi-line capabilities of the mobile terminal. In other implementations, network-centric mechanisms are provided for allowing multiple concurrent calls to be terminated by a mobile terminal. Multiple concurrent calls may be terminated at a mobile terminal on separate carrier frequencies or alternatively may be terminated on a common carrier frequency. Although the specific network architecture and nomenclature are depicted and described according to the GSM, it is understood that this is done so for illustrative purposes only and that the network architecture on which embodiments disclosed herein may be applied is not limited to any particular standard, but rather may be equivalently implemented on any other communications system supporting any variety of cellular communication systems, e.g., D-AMPS, GSM, CDMA, IS-41, ANSI-41, UMTS, etc. For example, variants of the disclosed embodiments may be implemented in a CDMA system by, rather than allocating timeslots on particular frequencies, instead allocating orthogonal codes (e.g., Walsh Codes) on a common frequency.

The flowcharts of FIGS. 7-13 depict process serialization to facilitate an understanding of disclosed embodiments and are not necessarily indicative of the serialization of the operations being performed. In various embodiments, the processing steps described in FIGS. 7-13 may be performed in varying order, and one or more depicted steps may be performed in parallel with other steps. Additionally, execution of some processing steps of FIGS. 7-13 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

What is claimed is:

1. A method, comprising:
receiving a second call at a mobile terminal while the mobile terminal is engaged in a first call in-progress on a first carrier frequency;
identifying that a second carrier frequency is both not a harmonic of the first carrier frequency and that the second carrier frequency has a greatest frequency separation from the first carrier frequency of any available frequency;
identifying an available time slot on the second carrier frequency to accommodate a third call in-progress on the first carrier frequency and which is not part of the first and second calls on the mobile terminal; and
establishing the second call with the mobile terminal in a time slot of the first carrier frequency.

2. The method of claim 1, comprising:
receiving a call request directed to the mobile terminal.

3. The method of claim 1, comprising:
identifying the second carrier frequency as a different carrier frequency that has more time slots available than the first carrier frequency allocated to the first call.

4. The method of claim 1, comprising:
performing a handover of the third call in-progress to the available time slot on the second carrier frequency.

5. The method of claim 1, wherein the time slot of the first carrier frequency was previously occupied by the third call in-progress.

6. The method of claim 1, wherein the second call is established while the first call is maintained in-progress on the first carrier frequency.

7. A non-transitory computer-readable storage medium comprising instructions that when executed by a processor cause the processor to:
receive a second call at a mobile terminal while the mobile terminal is engaged in a first call in-progress on a first carrier frequency;
identify that a second carrier frequency is not a harmonic of the first carrier frequency and that the second carrier frequency has a greatest frequency separation from the first carrier frequency of any available frequency;
identify an available time slot on the second carrier frequency to accommodate a third call in-progress on the first carrier frequency, and which is not part of the first and second calls on the mobile terminal; and
establish the second call with the mobile terminal in a time slot of the first carrier frequency.

8. The non-transitory computer-readable storage medium of claim 7, wherein the comprising instructions further cause the processor to:
receive a call request directed to the mobile terminal.

9. The non-transitory computer-readable storage medium of claim 7, wherein the instructions further cause the processor to:
identify the second carrier frequency as a different carrier frequency that has more time slots available than the first carrier frequency allocated to the first call.

10. The non-transitory computer-readable storage medium of claim 7, wherein the instructions further cause the processor to:
perform a handover of the third call in-progress to the available time slot on the second carrier frequency.

11. The non-transitory computer-readable storage medium of claim 7, wherein the time slot of the first carrier frequency was previously occupied by the third call in-progress.

12. The non-transitory computer-readable storage medium of claim 7, wherein the second call is established while the first call is maintained in-progress on the first carrier frequency.

13. A system, comprising:
a first antenna;
a first transceiver coupled to the first antenna; and
a processing system;
wherein a first call is received on a channel of a first carrier frequency over the first antenna and the first transceiver;
wherein the processing system executes instructions that cause the processing system to:
receive a second call at the mobile terminal while the mobile terminal is engaged in the first call in-progress on the first carrier frequency;
identify that a second carrier frequency is not a harmonic of the first carrier frequency and that the second carrier frequency has a greatest frequency separation from the first carrier frequency of any available frequency;
identify an available time slot on the second carrier frequency to accommodate a third call in-progress on the first carrier frequency and which is not part of the first and second calls on the mobile terminal; and
establish the second call with the mobile terminal in a time slot of the first carrier frequency.

14. The system of claim 13, further comprising:
a first subscriber identity module associated with a first cellular service subscription; and
a second subscriber identity module associated with a second cellular service subscription.

15. The system of claim 13, wherein the processing system is further configured to:
provide mid-call services for the second call and wherein the mid-call services comprise at least one of a call forwarding service, a call waiting service and a call conferencing service.

16. The system of claim 13, wherein the processing system is further configured to:
detect a call request of the second call while the first call is in progress, prohibits a ringing signal from being output by the mobile terminal and outputs an indication of a second call request.

17. The system of claim 13, wherein the processing system is further configured to:
receive an indication that the second call is accepted and notifies a carrier network from which the second call is inbound to the mobile terminal that the second call is accepted.

18. The system of claim 13, wherein content of the second call is bridged with content of the first call and output at the mobile terminal.

19. The system of claim 13, further comprising:
a microphone that receives audio input at the mobile terminal, wherein the audio input is transmitted on an uplink of at least one of the first channel and an uplink of a second channel.

20. The system of claim 13, wherein the second call is established with at least one of:
a call forwarding destination number in response to receipt of the first call, and wherein content of the first channel is bridged to a second channel; and
a call transfer destination number in response to a user supply of a call transfer command.

* * * * *